(12) United States Patent
Inukai

(10) Patent No.: US 9,658,681 B2
(45) Date of Patent: *May 23, 2017

(54) POWER SUPPLY SYSTEM AND IMAGE FORMING APPARATUS

(71) Applicant: BROTHER KOGYO KABUSHIKI KAISHA, Nagoya-shi, Aichi-ken (JP)

(72) Inventor: Katsumi Inukai, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,048

(22) Filed: May 4, 2015

(65) Prior Publication Data

US 2015/0234451 A1 Aug. 20, 2015

Related U.S. Application Data

(63) Continuation of application No. 13/289,875, filed on Nov. 4, 2011, now Pat. No. 9,030,845.

(30) Foreign Application Priority Data

Nov. 5, 2010 (JP) .................................. 2010-249081

(51) Int. Cl.
G06F 1/32 (2006.01)
(52) U.S. Cl.
CPC .......... *G06F 1/3293* (2013.01); *G06F 1/3284* (2013.01)
(58) Field of Classification Search
CPC ..... G06F 1/3284; G06F 1/3293; H02M 3/335

(Continued)

(56) References Cited

U.S. PATENT DOCUMENTS 4,058,758 A 11/1977 Peterson
4,755,922 A 7/1988 Puvogel
(Continued)

FOREIGN PATENT DOCUMENTS

EP 2 450 750 A2 9/2012
EP 2 451 067 A2 9/2012
(Continued)

OTHER PUBLICATIONS

Japan Patent Office, Notification of Reason for Refusal for Japanese Patent Application No. 2010-249081 (counterpart Japanese patent application), dispatched Jan. 8, 2013.

(Continued)

*Primary Examiner* — Yemane Mehari
(74) *Attorney, Agent, or Firm* — Merchant & Gould P.C.

(57) ABSTRACT

A power supply system includes: a switching power supply; and a control device, wherein the switching power supply includes: a transformer; a semiconductor switching element; a switch control unit; and a rectifying/smoothing circuit, the switch control unit is supplied with power from the main power supply, starts to control the switching of the semiconductor switching element, and oscillates a primary side of the transformer to induce a voltage on the secondary side of the transformer, the control device outputs a control pulse signal to the switch control unit to stop the oscillation of the transformer, thereby changing the mode of the switching power supply to an output stop mode, in an output mode in which the switching power supply smoothes the voltage induced on the secondary side and outputs the smoothed voltage.

12 Claims, 21 Drawing Sheets

(58) Field of Classification Search
USPC ......... 363/21.01, 21.07, 21.11, 21.15, 21.18; 307/31, 82, 86, 87, 130
See application file for complete search history.

(56) References Cited

U.S. PATENT DOCUMENTS

| | | | |
|---|---|---|---|
| 5,416,689 A | 5/1995 | Silverstein et al. | |
| 5,424,933 A | 6/1995 | Illingworth | |
| 5,834,857 A * | 11/1998 | Abe | H02J 7/0068 307/43 |
| 5,880,942 A | 3/1999 | Leu | |
| 5,914,538 A | 6/1999 | Kurosawa et al. | |
| 6,088,243 A | 7/2000 | Shin | |
| 6,104,622 A | 8/2000 | Shin | |
| 6,728,117 B2 | 4/2004 | Schemmann et al. | |
| 6,952,355 B2 | 10/2005 | Riggio et al. | |
| 7,161,815 B2 | 1/2007 | Mori | |
| 7,336,507 B2 | 2/2008 | Inukai | |
| 7,355,867 B2 | 4/2008 | Shuey | |
| 7,577,003 B2 | 8/2009 | Nakamura | |
| 7,719,860 B2 | 5/2010 | Usui | |
| 7,746,672 B2 | 6/2010 | Nishikawa | |
| 7,957,162 B2 | 6/2011 | Choi et al. | |
| 9,030,845 B2 * | 5/2015 | Inukai | H02M 1/36 363/21.01 |
| 2001/0043479 A1 | 11/2001 | Nagai et al. | |
| 2002/0089862 A1 | 7/2002 | Amei | |
| 2004/0027400 A1 | 2/2004 | Ryu et al. | |
| 2004/0109334 A1 | 6/2004 | Murakami | |
| 2004/0145924 A1 | 7/2004 | Jang et al. | |
| 2005/0078492 A1 | 4/2005 | Takahashi | |
| 2006/0221650 A1 | 10/2006 | Yamada | |
| 2007/0041224 A1 * | 2/2007 | Moyse | H02M 3/157 363/21.01 |
| 2008/0259659 A1 | 10/2008 | Choi et al. | |
| 2009/0237050 A1 | 9/2009 | Yamada et al. | |
| 2010/0135050 A1 | 6/2010 | Sonobe | |
| 2010/0244804 A1 | 9/2010 | Zong et al. | |
| 2011/0096572 A1 | 4/2011 | Liang et al. | |
| 2011/0103103 A1 | 5/2011 | Zhan et al. | |
| 2011/0175587 A1 | 7/2011 | Hosotani | |
| 2012/0027447 A1 | 2/2012 | Mukaibara | |
| 2012/0027448 A1 | 2/2012 | Mukaibara | |
| 2012/0049823 A1 | 3/2012 | Chen | |
| 2012/0113685 A1 | 5/2012 | Inukai | |
| 2012/0114363 A1 | 5/2012 | Inukai | |
| 2012/0250365 A1 | 10/2012 | Matsumoto | |
| 2013/0057875 A1 | 3/2013 | Hotogi et al. | |
| 2013/0108303 A1 | 5/2013 | Samejima et al. | |
| 2013/0134892 A1 | 5/2013 | Kado et al. | |
| 2013/0164016 A1 | 6/2013 | Inukai | |
| 2013/0257409 A1 | 10/2013 | Komiya | |

FOREIGN PATENT DOCUMENTS

| | | |
|---|---|---|
| JP | H06-351238 A | 12/1994 |
| JP | H07-087734 A | 3/1995 |
| JP | H07-298612 A | 11/1995 |
| JP | H08-248910 A | 9/1996 |
| JP | 11-103541 A | 4/1999 |
| JP | 2000-270546 A | 9/2000 |
| JP | 2001-275345 A | 10/2001 |
| JP | 2003-199340 A | 7/2003 |
| JP | 2004-194387 A | 7/2004 |
| JP | 2002-125368 A | 8/2005 |
| JP | 2005-218168 A | 8/2005 |
| JP | 2006-280138 A | 10/2006 |
| JP | 2009-278822 A | 11/2009 |
| JP | 2012-105378 A | 5/2012 |

OTHER PUBLICATIONS

State Intellectual Property Office of the People's Republic of China, Notification of First Office Action for 201110345307.1 (counterpart to above-captioned patent application), mailed Nov. 5, 2013.
Office Action (Notice of Allowance) issued in related U.S. Appl. No. 14/040,009, mailed May 1, 2015.
Extended European Search Report issued in corresponding European Patent Application No. 13186173.4, mailed Jun. 3, 2015.
Office Action issued in related U.S. Appl. No. 14/040,009, mailed Dec. 18, 2014.
Extended European Search Report issued in EP 11187728.8, Dec. 8, 2016.

* cited by examiner

|  | A | B | C |
|---|---|---|---|
| OUTPUT MODE | H | H | L |
|  | H | L | L |
| OUTPUT STOP MODE | L | H | H |
|  | L | L | L |

POWER SUPPLY SYSTEM AND IMAGE FORMING APPARATUS

CROSS REFERENCE TO RELATED APPLICATION

This application is a continuation application of U.S. patent application Ser. No. 13/289,875, filed Nov. 4, 2011, which further claims priority from Japanese Patent Application No. 2010-249081, which was filed on Nov. 5, 2010, the disclosure of both of which are herein incorporated by reference in their entirety.

TECHNICAL FIELD

The present invention relates to a power supply system and an image forming apparatus including a power supply system.

BACKGROUND

The following Patent Document 1 discloses a switching power supply device having a structure in which an IC detects the level of an input port IN and performs switching control on an FET connected to a primary coil of a transformer. Specifically, when the input port IN is at a high level, the IC stops the switching control of the FET. On the other hand, when the input port IN is at a low level, the IC starts the switching control of the FET to oscillate the transformer.

RELATED ART DOCUMENT

Patent Document

[Patent Document 1] JP-A-7-87734

SUMMARY

In the switching power supply device disclosed in Patent Document 1, the input port IN of the IC is connected to the intermediate connection point between a pair of resistors. Therefore, when power is turned on, the input port IN of the IC is at a high level. In order to start the switching control during startup (start the oscillation of the transformer), it is necessary to set the level of the input port IN to a low level. Therefore, a circuit (delay circuit) that sets the level of the input port IN to a low level when power is turned on. In addition, in Patent Document 1, in the standby mode, the oscillation of the transformer is stopped to reduce power consumption. However, power is supplied to the entire internal circuit of the IC that controls the transformer in the standby mode, which results in unnecessary power consumption.

The invention has been made in view of the above-mentioned problems and an object of the invention is to reduce the power consumption of a switching power supply and remove a delay circuit required for startup.

According to a first aspect of the invention, there is provided a power supply system including: a switching power supply that converts an input voltage applied from a main power supply and outputs the converted voltage; and a control device that is supplied with power from the switching power supply. The switching power supply includes: a transformer; a semiconductor switching element that is connected to a primary coil of the transformer; a switch control unit that controls the switching of the semiconductor switching element; and a rectifying/smoothing circuit that is provided on a secondary side of the transformer. The switch control unit is supplied with power from the main power supply, starts to control the switching of the semiconductor switching element, and oscillates a primary side of the transformer to induce a voltage on the secondary side of the transformer. The control device outputs a control pulse signal to the switch control unit to stop the oscillation of the transformer, thereby changing the mode of the switching power supply to an output stop mode, in an output mode in which the switching power supply smoothes the voltage induced on the secondary side and outputs the smoothed voltage.

In the power supply system, since the oscillation of the transformer is stopped in the output stop mode, it is possible to reduce power consumption. In addition, the switch control unit is supplied with power from the main power supply and starts to perform switching control (on/off control) on the semiconductor switching element. Therefore, when the switch control unit starts, the transformer starts to be oscillated. In other words, the switch control unit does not use a change in the level of the input port to a predetermined level, such as a low level or a high level, as the start conditions of the switching control. Therefore, it is not necessary to provide a circuit (delay circuit) for changing the level of the input port to a predetermined level when power is turned on. As a result, it is possible to simplify the structure of the circuit.

According to a second aspect of the invention, in the power supply system according to the first aspect, the control device may include a first electric storage unit that is charged by the output of the switching power supply and serves as a power supply for the control device in the output stop mode. In the output stop mode, the control device may output the control pulse signal to the switch control unit to restart the oscillation of the transformer, thereby changing the switching power supply from the output stop mode to the output mode.

In the power supply system, the control device can perform an operation of changing the mode from the output stop mode to the output mode. In addition, the mode of the switching power supply is controlled on the basis of whether the control pulse signal is input. Power consumed to output the control pulse signal is less than that consumed to output a high-level or a low-level signal. Therefore, the power consumption of the secondary side is small in the output stop mode and it is possible to maintain a charging state for a long time.

According to a third aspect of the invention, in the power supply system according to the first aspect, the control device may include a photoelectric cell that converts optical energy into power and serves as a power supply for the control device in the output stop mode. In the output stop mode, the control device may output the control pulse signal to the switch control unit to restart the oscillation of the transformer, thereby changing the switching power supply from the output stop mode to the output mode.

In the power supply system, the photoelectric cell is used as a power supply. Therefore, even when the generated electricity is completely consumed, the photoelectric cell receives light, generates power again, and supplies power to the control device. Therefore, the control device is not completely stopped.

According to a fourth aspect of the invention, in the power supply system according to the second or third aspect, the switch control unit may include: a driver circuit that outputs an on/off signal to the semiconductor switching element to oscillate the transformer; a start circuit that is supplied with power from the main power supply and starts; a first power circuit that starts with the start of the start circuit and supplies power to the driver circuit in the output mode; an oscillation stop circuit that breaks the first power circuit to stop the oscillation of the transformer when the control pulse signal is input in the output mode; a restart circuit that restarts the start circuit when the control pulse signal is input in the output stop mode; and a second power circuit that supplies power to the restart circuit in the output stop mode.

In the power supply system, the first power circuit of the switch control unit is stopped in the output stop mode. Therefore, in the output stop mode, the first power circuit or the driver circuit does not consume power. As a result, it is possible to reduce the power consumption of the switch control unit.

According to a fifth aspect of the invention, in the power supply system according to the fourth aspect, the switch control unit may include an input port to which the control pulse signal output from the control device is input, and the oscillation stop circuit and the restart circuit may be commonly connected to the input port.

In the power supply system, the oscillation stop circuit and the restart circuit share the input port. Therefore, it is possible to reduce the number of ports of the switch control unit, as compared to the structure in which the input ports are separately provided.

According to a sixth aspect of the invention, in the power supply system according to the fifth aspect, the switch control unit may further include an inhibition circuit that inhibits the restart circuit from restarting the start circuit when the oscillation stop circuit stops the oscillation of the transformer.

When the oscillation stop circuit and the restart circuit share the input port, the control pulse signal is simultaneously input to the two circuits. Therefore, there is a concern that the following error in operation will occur: the restart circuit falsely recognizes the control pulse signal which is output in order to change the mode from the output mode to the output stop mode (that is, in order to stop oscillation) as a signal for restart and restarts the start circuit when the mode is changed to the output stop mode. From this point of view, in the power supply system, the inhibition circuit 75 inhibits the restart circuit from restarting the start circuit when the oscillation stop circuit stops the oscillation of the transformer (when the mode is changed to the output stop mode). Therefore, it is possible to prevent the error in operation.

According to a seventh aspect of the invention, in the power supply system according to the fifth aspect, the control device may output control pulse signals with different pulse widths and the control pulse signals may include a control pulse signal for a change to the output stop mode and a control pulse signal for a change to the output mode. In the power supply system, it is possible to determine whether the control pulse signal is a signal for a change to the output stop mode or a signal for a change to the output mode on the basis of the pulse width. Therefore, similarly to the sixth aspect of the invention, even when the control pulse signal is simultaneously input to the oscillation stop circuit and the restart circuit through the common input port, it is possible to prevent an error in operation, such as the error of the restart circuit restarting the start circuit when the mode is changed to the output stop mode.

According to an eighth aspect of the invention, in the power supply system according to the seventh aspect, a filter circuit that removes the control pulse signal for a change to the output stop mode may be provided in an input stage of the restart circuit. In the power supply system, the control pulse signal for a change to the output stop mode is removed by the filter circuit and is not input to the restart circuit. Therefore, it is possible to prevent the error in operation due to the use of the common input port. In other words, since the signal causing the error in operation is removed, it is possible to reliably prevent the error in operation, as compared to the structure that detects the pulse width and determines the intention of the output of a signal.

According to a ninth aspect of the invention, in the power supply system according to any one of the fifth to eighth aspects, the control device may further include: a storage unit that stores information indicating whether the mode settings of the switching power supply are the output mode or the output stop mode; a detecting unit that detects whether the state of the switching power supply is the output mode or the output stop mode; and a check unit that checks the content of the mode settings stored in the storage unit and the detection result of the detecting unit. When the content of the mode settings is not identical to the detection result, the control pulse signal may be re-output to the switching power supply such that the switching power supply is changed to the set mode.

In the power supply system, even when the switch control unit erroneously changes the mode of the switching power supply due to the influence of noise, it is possible to immediately recover the mode.

According to a tenth aspect of the invention, in the power supply system according to the ninth aspect, the detecting unit may detect an output voltage from the switching power supply. In the power supply system, it is possible to reliably detect the state of the switching power supply.

According to an eleventh aspect of the invention, in the power supply system according to any one of the fourth to tenth aspects, the switch control unit may further include a second electric storage unit that is charged by a voltage which is induced in an auxiliary coil provided on the primary side of the transformer or the first power circuit, which serves as a power supply, in the output mode and function as a voltage source of the second power circuit or the second power circuit. In the power supply system, the main power supply, which is a supply source, consumes no power in the output stop mode.

According to a twelfth aspect of the invention, there is provided an image forming apparatus including a printing unit that performs a printing process and the power supply system according to any one of the first to eleventh aspects. The switching power supply of the power supply system supplies power to the printing unit in the output mode, and the supply of power from the switching power supply of the power supply system to the printing unit is stopped in the output stop mode.

According to the invention, it is possible to reduce the power consumption of the switching power supply and remove a delay circuit required for startup.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

<First Embodiment>

A first embodiment of the invention will be described with reference to FIGS. 1 to 5.

1. Description of Printer

Figure 1:
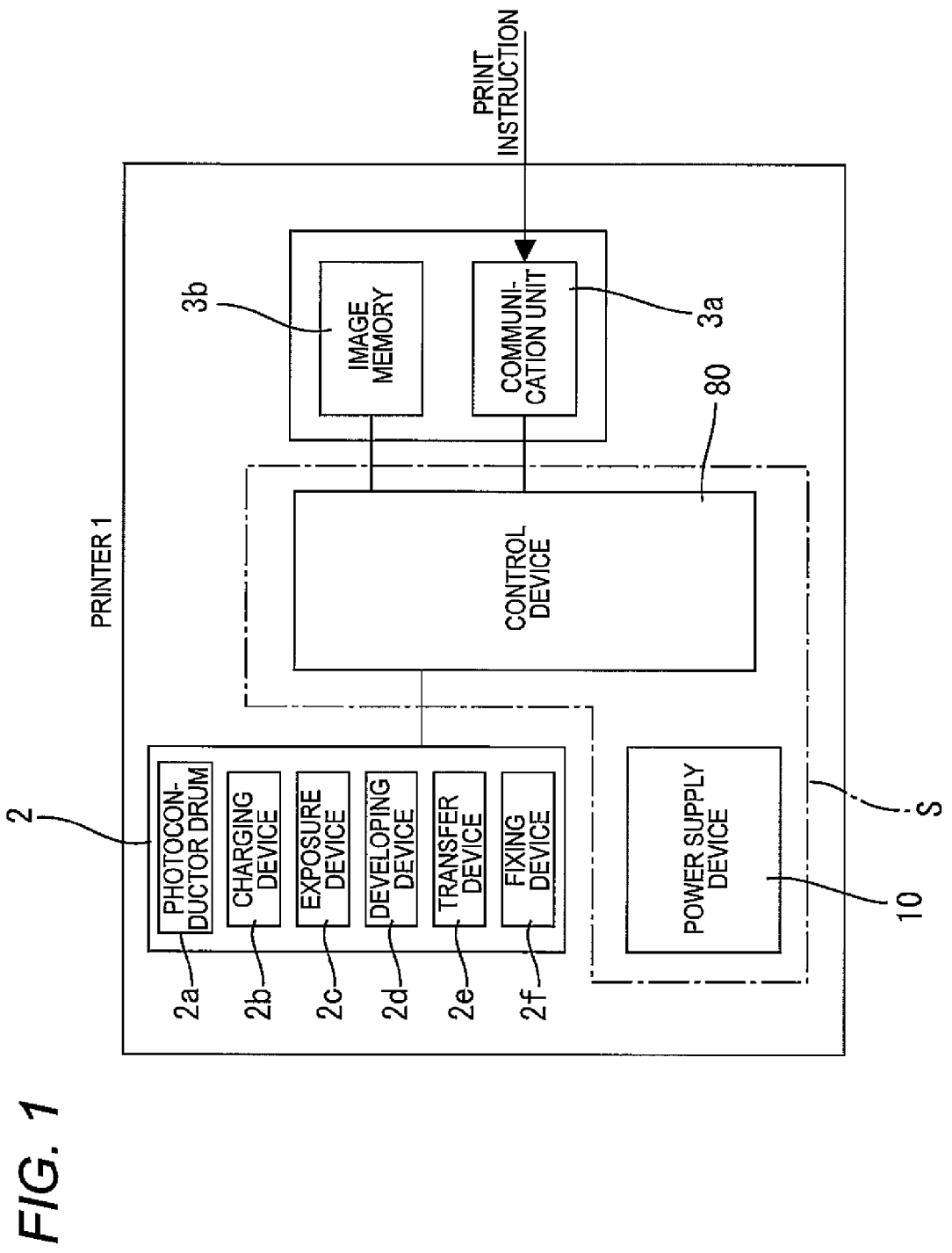
FIG. 1 is a block diagram illustrating the electrical structure of a printer according to a first embodiment of the invention.

FIG. 1 is a block diagram illustrating the electrical structure of a printer (an example of an "image forming apparatus" according to the invention) 1. The printer 1 includes a printing unit 2, a communication unit 3a, an image memory 3b, and a power supply system S. The power supply system S includes a power supply device 10 and a control device 80. The power supply device 10 is a power supply for the printer 1 and supplies power to the printing unit 2, the communication unit 3a, the image memory 3b, and the control device 80.

The printing unit 2 includes, for example, a photoconductor drum 2a, a charging device 2b that performs a charging process of charging the surface of the photoconductor drum 2a, an exposure device 2c that performs an exposure process of forming an electrostatic latent image on the surface of the photoconductor drum 2a, a developing device 2d that performs a developing process of attaching a developer to the electrostatic latent image formed on the surface of the photoconductor drum 2a to form a developer image, a transfer device 2e that performs a transfer process of transferring the developer image onto a recording medium, and a fixing device 2f that performs a fixing process of fixing the developer image transferred onto the recording medium.

The printing unit 2 performs a printing process of performing the charging process, the exposure process, the developing process, the transfer process, and the fixing process to print print data on the recording medium. The communication unit 3a communicates with an information terminal apparatus, such as a PC, and has a function of receiving a print instruction or print data from the information terminal apparatus. The image memory 3b temporarily stores the print data received from the information terminal apparatus.

In the printer 1, when the communication unit 3a receives a print instruction from the information terminal apparatus, the control device 80 directs the printing unit 2 to perform the printing process including the charging process, the exposure process, the developing process, the transfer process, and fixing process to print the print data on the recording medium. The operation voltage of the printing unit 2 is 24 V and the operation voltage of the communication unit 3a, the image memory 3b, and the control device 80 is 3.3 V.

2. Description of Circuit of Power Supply System

First, the structure of the power supply device 10 in the power supply system S will be described with reference to FIG. 2.

The power supply device 10 includes a switching power supply 20, a DC-DC converter 35, and a DC-DC converter 45. The switching power supply 20 includes a rectifying/smoothing circuit 21, a transformer 23, an FET (field effect transistor) 25, a rectifying/smoothing circuit 27, a voltage detecting circuit 29, a control IC 50 that performs switching control on the FET 25. The FET is an example of a "semiconductor switching element" according to the invention and the control IC is an example of a "switch control unit" according to the invention.

The rectifying/smoothing circuit 21 is a so-called capacitor input type and includes a bridge diode D1 that rectifies an AC voltage (220 V) of an AC power supply 15 (corresponding to a "main power supply" according to the invention) and a capacitor C1 that smoothes the rectified voltage. The transformer 23 is provided on the output side of the rectifying/smoothing circuit 21 and an input voltage Vin (a DC voltage of about 322 V) obtained by rectifying and smoothing the AC voltage is applied to a primary coil N1 of the transformer 23 through an input line Lin.

The FET 25 is an N-channel MOSFET and has a drain D connected to the primary coil N1 and a source S connected to the ground. When an on/off signal (PWM signal) is supplied from the control IC 50 to a gate G of the FET 25, the FET 25 is turned on or off. In this way, the primary side of the transformer 23 is oscillated and a voltage is induced in a secondary coil N2 of the transformer 23.

The voltage generating circuit 31 is provided on the primary side of the transformer 23. The voltage generating circuit 31 rectifies and smoothes the voltage induced in an auxiliary coil N3 which is provided on the primary side of the transformer 23 using a diode D2 and a capacitor C2. The voltage generating circuit 31 serves as a power supply (about 20 V) for the control IC 50.

The rectifying/smoothing circuit 27 is provided on the secondary side of the transformer 23 and includes a diode D3 and a capacitor C3. The rectifying/smoothing circuit 27 rectifies and smoothes the voltage induced in the secondary coil N2 of the transformer 23. In this way, the switching power supply 20 outputs a DC voltage of 24 V through an output line Lo1.

Figure 2:
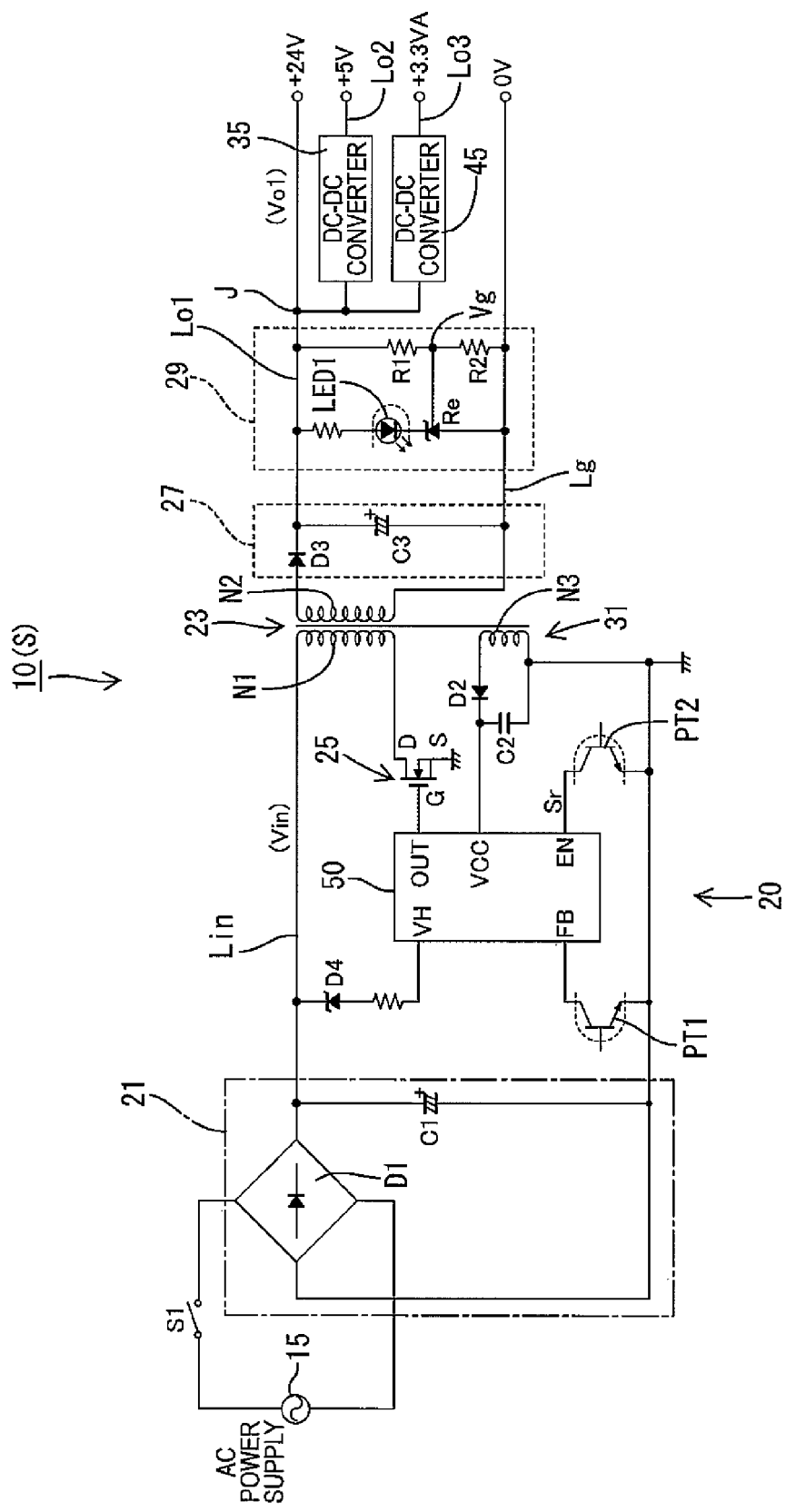
FIG. 2 is a circuit diagram illustrating a power supply device of a power supply system.

As shown in FIG. 2, the output line Lo1 is branched into three lines at a branch point J and DC-DC converters 35 and 45 are connected to the branched lines. The DC-DC converter 35 reduces the output voltage Vo1 of the switching power supply 20 to 5 V and outputs the voltage to an output line Lo2. The DC-DC converter 45 reduces the output voltage Vo1 of the switching power supply 20 to 3.3 V and outputs the voltage to an output line Lo3. As such, the power supply device 10 outputs three voltages of 24 V, 5 V, and 3.3 V.

The voltage detecting circuit 29 is provided between the rectifying/smoothing circuit 27 and the branch point J of the output lines. The voltage detecting circuit 29 detects the level of the output voltage Vo1 (DC 24 V) of the switching power supply 20 and includes a pair of detection resistors R1 and R2, a shunt regulator Re, and a light emitting diode LED1 that is connected in series to the shunt regulator Re.

The detection resistors R1 and R2 are provided between the output line Lo1 and a ground line Lg and detect a divided voltage Vg obtained by dividing the output voltage Vo1 by the resistance ratio. The shunt regulator Re supplies a current corresponding to the level difference between the divided voltage Vg and the reference voltage of the shunt regulator Re. In this way, a current flows to the light emitting diode LED1 and the light emitting diode LED1 outputs an optical signal with the amount of light corresponding to the level difference between the reference voltage and the divided voltage Vg.

The light emitting diode LED1 and a phototransistor PT1 connected to a feedback port FB of the control IC 50 form a photocoupler. Therefore, the optical signal of the light emitting diode LED1 is restored to an electric signal by the phototransistor PT1. In this way, a signal (hereinafter, referred to as a feedback signal) indicating the level difference between the reference voltage of the shunt regulator Re and the divided voltage Vg is input (fed back) to the feedback port FB of the control IC 50.

As shown in FIG. 2, the control IC 50 includes five ports, that is, a power supply port VCC that is connected to the voltage generating circuit 31, a high-voltage input port VH that is connected to the input line Lin through a zener diode D4, a feedback port FB to which the feedback signal (output voltage detection signal) is input, an output port OUT that outputs an on/off signal (PWM signal), and a control input port (an example of an "input port" according to the invention) EN to which a control pulse signal Sr output from the control device 80 is input.

Figure 3:
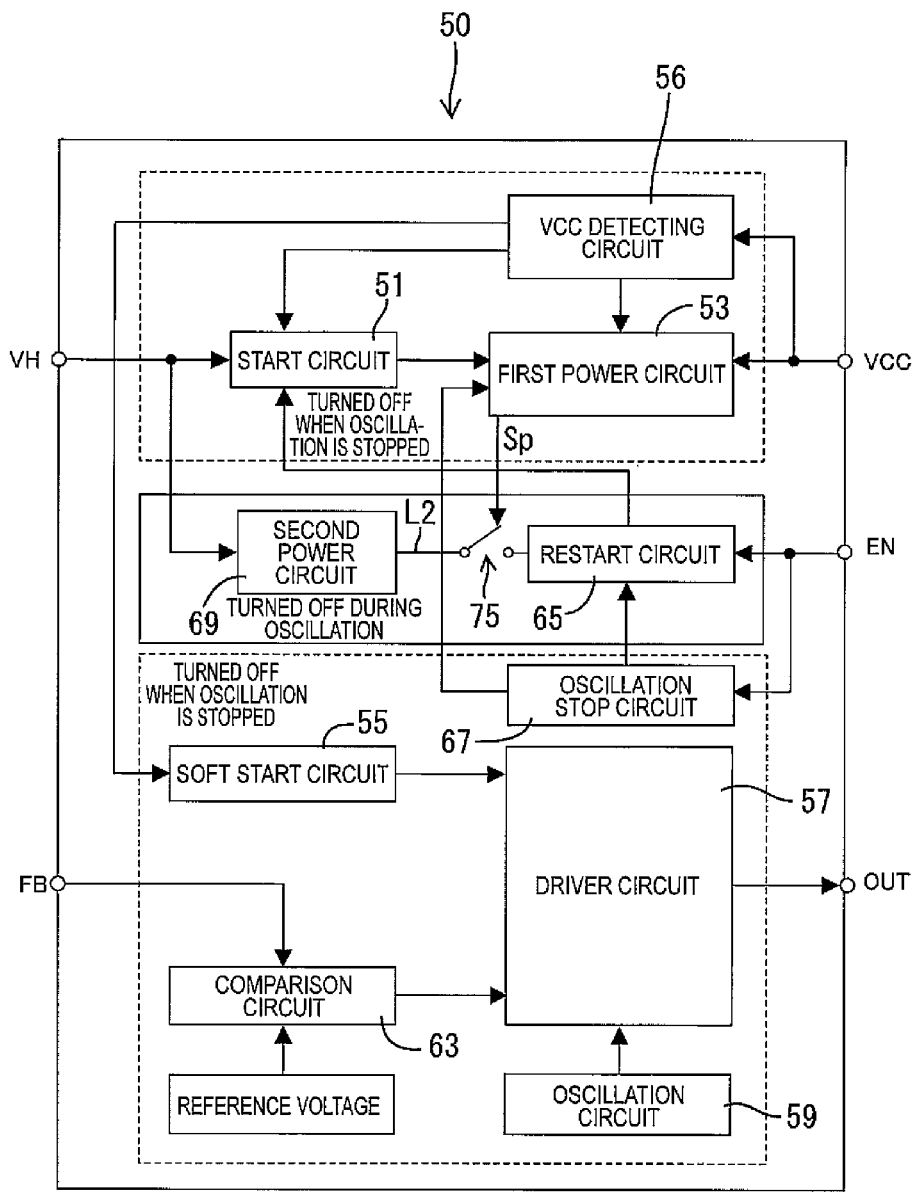
FIG. 3 is a block diagram illustrating a control IC.

Next, the circuit block of the control IC 50 will be described with reference to FIG. 3. The control IC 50 includes a start circuit 51 connected to the high-voltage input port VH, a first power circuit 53, a soft start circuit 55, a VCC detecting circuit 56, a driver circuit 57 connected to the output port OUT, an oscillation circuit 59 that oscillates a triangular wave with a predetermined frequency, a comparison circuit 63 connected to the feedback port FB, a restart circuit 65, an oscillation stop circuit 67, a second power circuit 69, and an inhibition circuit 75. The restart circuit 65 and the oscillation stop circuit 67 are commonly connected to the control input port EN (the input lines of the two circuits 65 and 67 are connected to the control input port EN). Therefore, the two circuits 65 and 67 can receive the signal input to the control input port EN (specifically, the control pulse signal Sr which will be described below).

The start circuit 51 reduces an input voltage applied to the high-voltage input port VH and supplies the voltage to the first power circuit 53. The first power circuit 53 supplies power to the circuits 55, 56, 57, 59, 63, and 67 except for the restart circuit 65 and the second power circuit 69. The first power circuit 53 is supplied with power from the start circuit 51 until the voltage of the power supply port VCC increases to a predetermined level immediately after startup, generates a power supply voltage of 5 V, and supplies power to each circuit. After the voltage of the power supply port VCC reaches the predetermined level, the first power circuit 53 is supplied with power from the voltage generating circuit 31, generates a power supply voltage of 5 V, and supplies power to the circuits 55, 56, 57, 59, 63, and 67.

The soft start circuit 55 increases the duty ratio of the on/off signal (PWM signal) which is applied to the gate G of the FET 25 through the driver circuit 57 in stages and slowly increases the output of the switching power supply 20 during startup.

The comparison circuit 63 performs an operation of comparing the level of the feedback signal with the level of the reference voltage and outputs the feedback signal to the driver circuit 57 according to the comparison result.

The driver circuit 57 outputs the on/off signal (PWM signal) to the gate G of the FET 25 to perform switching control on the FET 25. The PWM value of the PWM signal is determined on the basis of the feedback signal input to the feedback port FB.

The oscillation stop circuit 67 breaks the first power circuit 53 on condition that the control pulse signal Sr is input to the control input port EN during the oscillation of the transformer 23 (in the output mode, which will be described below). The term "breaking" means cutting the supply of power from the voltage generating circuit 31 to the first power circuit 53 to stop the first power circuit 53. When the first power circuit 53 is broken, the supply of power to the circuits 56, 57, 59, 63, and 67 is cut and the output of the driver circuit 57 is stopped (the impedance of the output port OUT is high). Therefore, the oscillation of the transformer 23 is stopped.

The restart circuit 65 outputs a restart signal to the start circuit 51 to restart the start circuit 51 on condition that the control pulse signal Sr is input to the control input port EN when the first power circuit 53 is broken (in the output stop mode, which will be described below). The second power circuit 69 serves as a power supply for the restart circuit 65. The second power circuit 69 and the start circuit 51 are connected to the high-voltage input port VH. The second power circuit 69 reduces the voltage input from the high-voltage input port VH to generate a power supply voltage of 5 V and supplies power to the restart circuit 65 through a power line L2.

Figure 4:
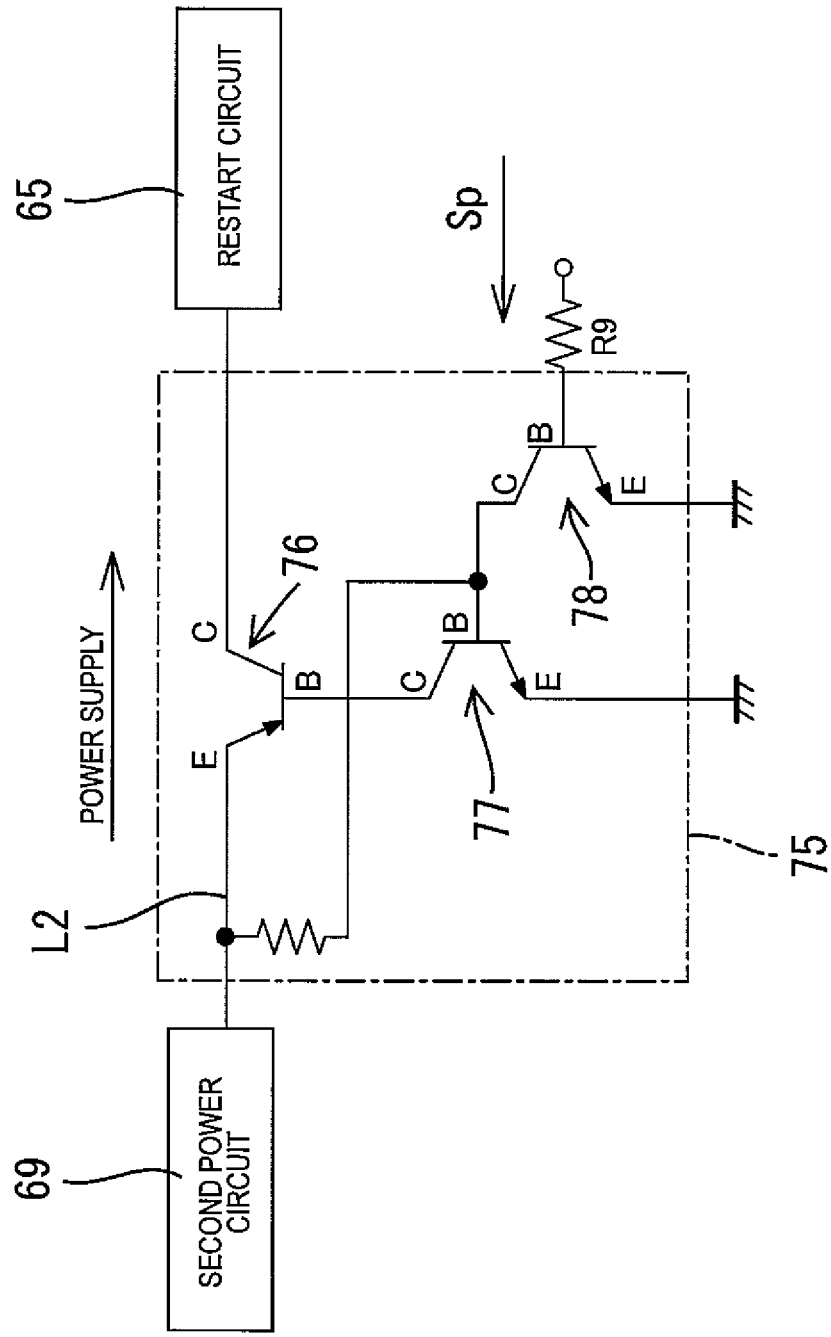
FIG. 4 is a circuit diagram illustrating an inhibition circuit.

The inhibition circuit 75 inhibits the restart circuit 65 from restarting the start circuit 51 while the first power circuit 53 outputs a high-level operation signal Sp and includes three transistors 76, 77, and 78 shown in FIG. 4. The transistor 76 is a PNP transistor. The transistor 76 is provided on the power line L2 and has an emitter E connected to the second power circuit 69 and a collector C connected to the restart circuit 65. The transistor 77 is an NPN transistor and has a collector C connected to the base of the transistor 76 and an emitter E connected to the ground. The transistor 77 has a base B which is connected to the power line L2 through a bias resistor R8.

The transistor 78 is an NPN transistor and has a collector C connected to the base of the transistor 77 and an emitter E connected to the ground. The high-level operation signal Sp output from the first power circuit 53 is input to the base B of the transistor 78.

When the high-level operation signal Sp is input to the base B of the transistor 78, the transistor 78 is turned on, the transistor 77 is turned off, and the transistor 76 is turned off. Therefore, the power line L2 is opened. On the other hand, when the operation signal Sp is not input, the on and off states of the transistors are reversed and the transistor 76 is turned on. Therefore, the power line L2 is closed.

The first power circuit 53 outputs the operation signal Sp to the inhibition circuit 75 during the oscillation of the transformer 23 (in the output mode which will be described below). Therefore, during the oscillation of the transformer 23, the power line L2 is turned off and no power is supplied to the restart circuit 65. As a result, the restart circuit 65 is in an off state. Therefore, it is possible to inhibit the restart circuit 65 from restarting the start circuit 51 during the oscillation of the transformer 23.

When the oscillation of the transformer 23 is stopped (in the output stop mode which will be described), the operation signal Sp is not output and the power line L2 is turned on. Therefore, the restart circuit 65 restarts the start circuit 51.

Next, the control device 80 will be described with reference to FIG. 5. The control device 80 includes a main block B1 that controls the printing unit 2 of the printer 1 and a mode control block B2.

A power supply port P1 of the main block B1 is connected to the output line Lo3 of the DC-DC converter 45 and power is supplied from the switching power supply 20 to the power supply port P1 through the DC-DC converter 45. The main block B1 is supplied with power and is turned on only in the output mode, which will be described below. When the switching power supply 20 is changed to the output stop mode, which will be described below, the supply of power to the main block B1 is cut and the main block B1 is turned off.

A power supply port P2 of the mode control block B2 is connected to the DC-DC converter 35 and power is supplied from the switching power supply 20 to the power supply port P2 through the DC-DC converters 35 and 83. Specifically, a capacitor (electric double layer capacitor for storage) C4 is connected to the output line Lo2 of the DC-DC converter 35 through the diode D4. The diode D4 prevents an inverse current from the capacitor C4 to the DC-DC converter 35. The capacitor C4 is an example of a "first electric storage unit" according to the invention.

A relay line L1 is drawn from a connection point between the capacitor C4 and the diode D4. A DC-DC converter 83 is provided on the relay line L1, reduces the output voltage of the DC-DC converter 35 to 3.3 V, and applies the voltage to the power supply port P2 of the mode control block B2. Therefore, the mode control block B2 is supplied with power from the switching power supply 20 through the DC-DC converters 35 and 83 in the output mode.

The capacitor C4 serves as a power supply for the mode control block B2 in the output stop mode and a charging current is supplied from the DC-DC converter 35 to the capacitor C4 through the output line Lo2.

A control port P3 is provided in the mode control block B2 and is connected to a base B of a transistor 85. The transistor 85 has an emitter E connected to the ground and a collector C connected to the cathode of a light emitting diode LED2.

The light emitting diode LED2 has an anode connected to the relay line L1. The light emitting diode LED2 and a phototransistor PT2 connected to the control input port EN of the control IC 50 form a photocoupler. Therefore, when the control pulse signal Sr is output from the control port P3 of the mode control block B2 to the base of the transistor 85, the control pulse signal Sr is optically transmitted to the control input port EN of the control IC 50 through the photocoupler.

The mode control block B2 has a function of outputting the control pulse signal Sr to the control IC 50 to switch the operation mode of the switching power supply 20 between the output mode and the output stop mode. The output mode oscillates the primary side of the transformer 23 to change the switching power supply 20 to an output state. The output stop mode stops the oscillation of the transformer 23 to stop the output of the switching power supply 20. The control pulse signal Sr is not classified into a signal waveform for changing the operation mode to the output mode and a signal waveform for changing the operation mode to the output stop mode, but is set such that the control pulse signal Sr with the same pulse width is output when the operation mode is changed to the output mode and when the operation mode is changed to the output stop mode.

The mode control block B2 includes a timer 90. The timer 90 measures the time from the switching of the mode. The reason why the elapsed time is measured is as follows. In the output stop mode, the mode control block B2 is supplied with power from the capacitor C4 and is operated. Therefore, when the output stop mode is kept for a long time, the charging voltage of the capacitor C4 is reduced and it is difficult to maintain the output voltage of the DC-DC converter 83 at 3.3 V. Therefore, it is necessary to measure time with the timer 90, change the operation mode of the switching power supply 20 to the output mode before the output voltage of the DC-DC converter 83 is not maintained at 3.3 V, and recharge the capacitor C4.

Figure 5:
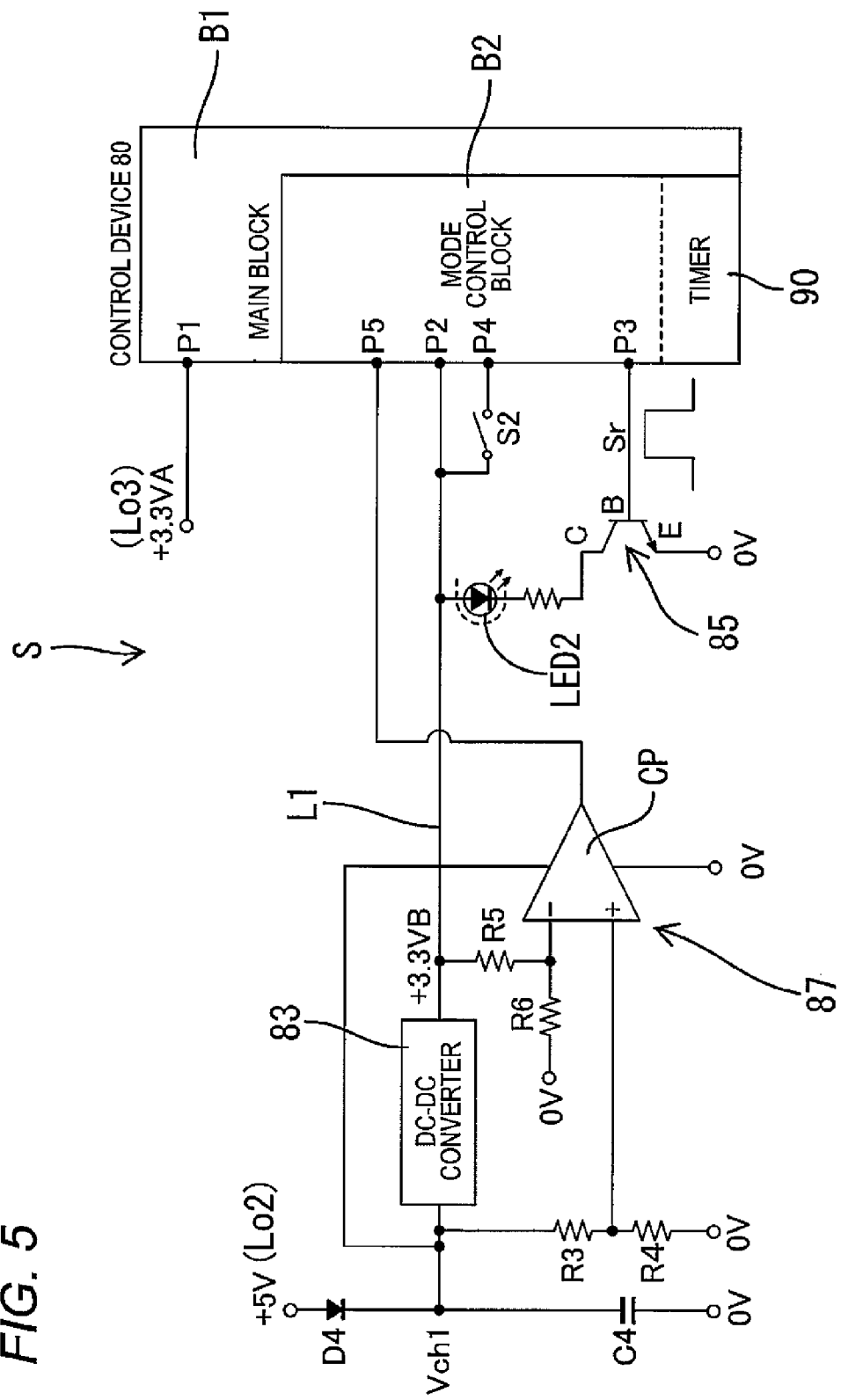
FIG. 5 is a circuit diagram illustrating a control device of the power supply system.

The detection circuit 87 shown in FIG. 5 detects a charging voltage Vch1 of the capacitor C4. The detection circuit 87 includes detection resistors R3 and R4 that detect the charging voltage Vch1 of the capacitor C4, a comparator CP that compares the voltage values detected by the detection resistors R3 and R4 with a reference value and outputs the comparison result, and voltage-dividing resistors R5 and R6 for a reference voltage.

When the charging voltage Vch1 is more than the reference voltage, the comparator CP outputs a high-level detection signal to a port P5 of the mode control block B2. When the charging voltage Vch1 is less than the reference voltage, the comparator CP outputs a low-level detection signal to a port P5.

Even when the low-level detection signal is output from the comparator CP, the mode control block B2 changes the operation mode of the switching power supply 20 to the output mode to recharge the capacitor C4.

A switch S2 shown in FIG. 5 is a mode switch used by the user to instruct the mode control block B2 to change the mode.

3. Description of Operation of Power Supply System S 3-1. Operation when AC Power Supply is Turned on When the power supply switch S1 is turned on, the input voltage Vin obtained by rectifying and smoothing the AC voltage of the AC power supply 15 is applied to the input line Lin of the switching power supply 20. Then, since power is supplied from the AC power supply 15 through the high-voltage input port VH, the start circuit 51 and the second power circuit 69 in the control IC 50 starts. The structure according to the invention in which "the switch control unit (control IC 50) is supplied with power from the main power supply (AC power supply 15) and then starts" is implemented by the above.

After the start circuit 51 starts, it reduces the input voltage Vin and outputs the voltage to the first power circuit 53. The first power circuit 53 generates a power supply voltage of 5 V from the voltage which is output from the start circuit 51 and supplies power to the circuits 55, 56, 57, 59, 63, and 67 except for the restart circuit 65.

When the first power circuit 53 starts to supply power to the circuits 55, 56, 57, 59, 63, and 67, first, the soft start circuit 55 is operated. The soft start circuit 55 gives an on/off signal (PWM signal) to the gate G of the FET 25 through the driver circuit 57. Then, the FET 25 is repeatedly turned on and off. As a result, the primary side of the transformer 23 in the switching power supply 20 starts to be oscillated and a voltage is induced on the secondary side of the transformer 23 (the start of oscillation).

The soft start circuit 55 increases the PWM value in stages. As a result, the on time of the FET 25 increases in stages and the output of the switching power supply 20 increases slowly. When the output of the switching power supply 20 increases, the output voltage Vcc of the voltage generating circuit 31 also increases.

The VCC detecting circuit 56 monitors the output voltage Vcc of the voltage generating circuit 31. When the output voltage Vcc is more than the reference value, the VCC detecting circuit 56 instructs the first power circuit 53 to change a power supply source from the start circuit 51 to the voltage generating circuit 31. Then, the output voltage Vcc of the voltage generating circuit 31 is more than the reference level. Thereafter, the first power circuit 53 is supplied with power from the voltage generating circuit 31 and the start circuit 51 is stopped.

When the output voltage Vcc of the voltage generating circuit 31 is more than the reference level, the VCC detecting circuit 56 stops the soft start circuit 55. After the soft start circuit 55 is stopped, the operation is changed to feedback control and the driver circuit 57 performs a PWM output operation based on the feedback signal input to the feedback port FB. In this way, the switching power supply 20 adjusts the output such that the output voltage Vo1 detected by the voltage detecting circuit 29 becomes a target voltage of 24 V (output mode).

In the output mode, the power supply device 10 supplies power to each component of the printer 1. That is, the switching power supply 20 supplies power to the printing unit 2 through the output line Lo1 (power supply voltage: 24 V). In addition, the switching power supply 20 supplies power to the communication unit 3a, the image memory 3b, and the main block B1 of the control device 80 through the DC-DC converters 35 and 45 (power supply voltage: 3.3 V). The switching power supply 20 supplies power to the mode control block B2 of the control device 80 through the DC-DC converters 35 and 83 (power supply voltage: 3.3 V). Therefore, the printer 1 is in a printable state, that is, in a state in which it can receive a print instruction from an information terminal apparatus, such as a PC, and perform the printing process corresponding to the print instruction.

In the output mode, a charging current is supplied to the capacitor C4 through the output line Lo1 of the switching power supply 20 and the diode D4. Therefore, the capacitor C4 is charged.

3-2. Change from Output Mode to Output Stop Mode

In the following cases (a) and (b), in order to change the mode to the output stop mode, the mode control block B2 of the control device 80 outputs the control pulse signal Sr to the transistor 85.

(a) A case in which a mode switch S2 is operated in the output mode.

(b) A case in which the printer 1 is in a standby state for a predetermined period of time.

The output control pulse signal Sr is optically transmitted to the control input port EN of the control IC 50 through the photocoupler.

In the output mode, the power line L2 is in an off (opened) state and the restart circuit 65 is stopped. Therefore, the restart circuit 65 is not capable of receiving the control pulse signal Sr input to the control input port EN, but only the oscillation stop circuit 67 is capable of receiving the control pulse signal Sr. When the oscillation stop circuit 67 receives the control pulse signal Sr, it breaks the first power circuit 53. In this way, the supply of power from the first power circuit 53, which is a power supply source, to the circuits 56, 57, 59, 63, and 67 is stopped.

Figure 6:
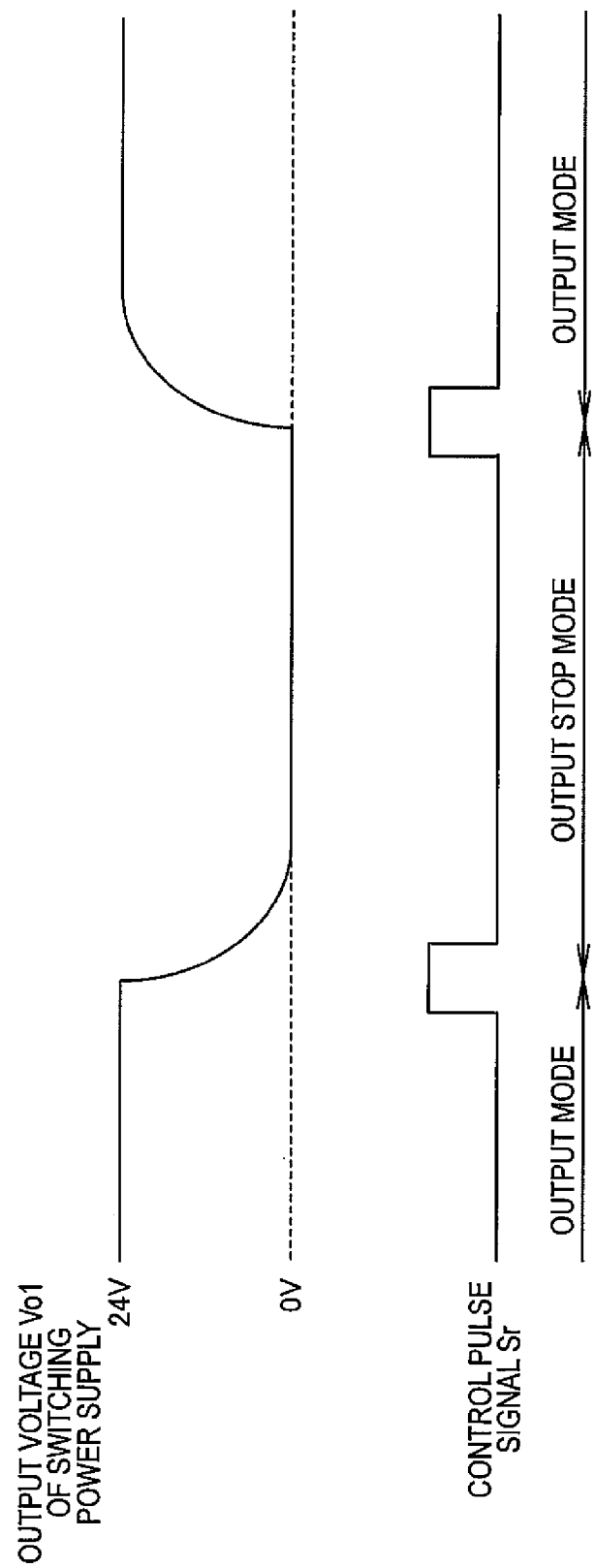
FIG. 6 is a diagram illustrating the output waveform of the switching power supply.

Then, the driver circuit 57 is stopped and the impedance of the output port OUT is high. As a result, the oscillation of the primary side of the transformer 23 is stopped. Therefore, the switching power supply 20 is changed to the output stop mode in which the output of the switching power supply 20 is stopped (see FIG. 6).

Since the switching power supply 20 is in an output stop state in the output stop mode, the supply of power to the printing unit 2, the communication unit 3a, the image memory 3b, and the main block B1 of the control device 80 is stopped. The mode control block B2 of the control device 80 is in an on state since it is supplied with power from the capacitor C4.

The timer 90 provided in the mode control block B2 measures the time elapsed from the time when the mode is changed. In the output stop mode, since the operation signal Sp is not output from the first power circuit 53, the power line L2 is in an on (closed) state. Therefore, the restart circuit 65 is supplied with power from the second power circuit 69 and is in an on state.

3-3. Change from Output Stop Mode to Output Mode

In the cases (c) to (e), in order to change the mode to the output mode, the mode control block B2 of the control device 80 outputs the control pulse signal Sr to the transistor 85 again.

(c) A case in which the elapsed time measured by the timer 90 reaches the set time.

(d) A case in which a low-level detection signal is output from the comparator CP to the port P5.

(e) A case in which a switch SW2 is operated in the output stop mode.

The control pulse signal Sr is optically transmitted to the control input port EN of the control IC 50 through the photocoupler.

In the output stop mode, the supply of power to the oscillation stop circuit 67 is cut, but the restart circuit 65 is supplied with power from the second power circuit 69 and is then operated. Therefore, only the restart circuit 65 can receive the control pulse signal Sr input to the control input port EN. When receiving the control pulse signal Sr, the restart circuit 65 restarts the start circuit 51.

In this way, at the same time as the AC power supply is turned on, the first power circuit 53 generates a power supply voltage of 5 V from the voltage which is applied from the start circuit 51 and supplies power to the circuits 55, 56, 57, 59, 63, and 67 which are supplied with power from the first power circuit 53. Then, the soft start circuit 55 is operated to slowly increase the output of the switching power supply 20 and the switching power supply 20 is changed to the output mode again (see FIG. 6).

4. Description of Effect

As described above, in the power supply system S, in the output stop mode, the oscillation of the primary side of the transformer 23 is stopped. Therefore, it is possible to reduce power consumption. In addition, since the delay circuit, which is an indispensable component of the circuit according to the related art, can be removed, it is possible to simplify the structure of the apparatus. The reason why the delay circuit can be removed is that the control IC 50 does not use a change in the level of the control input port EN to a predetermined level, such as a low level or a high level, as the start conditions of switching control.

The mode of the switching power supply 20 is controlled by the control pulse signal Sr. The control pulse signal Sr consumes less power than a level signal in order to output signals. In this way, in the output stop mode, the power consumption of the mode control block B2 is small and it is possible to maintain the charging state of the capacitor C4 for a long time.

In the output stop mode, the control IC 50 breaks the first power circuit 53 to stop the supply of power to the circuits 55, 56, 57, 59, 63, and 67 which are supplied with power from the first power circuit 53. Therefore, the control IC 50 consumes little power and it is possible to reduce power consumption.

When the oscillation stop circuit 67 and the restart circuit 65 are connected to the common control input port EN, the control pulse signal Sr is input to the two circuits 67 and 65 at the same time. Therefore, there is a concern that the following error in operation will occur: the restart circuit 65 falsely recognizes the control pulse signal Sr which is output in order to change the mode from the output mode to the output stop mode (that is, in order to stop oscillation) as a signal for restart and restarts the start circuit when the mode is changed to the output stop mode.

From this point of view, in this embodiment, the inhibition circuit 75 inhibits the restart circuit 65 from restarting the start circuit 51 when the oscillation stop circuit 67 stops the oscillation of the transformer 23 (when the mode is changed to the output stop mode). Therefore, it is possible to prevent the error in operation.

<Second Embodiment>

Figure 8:
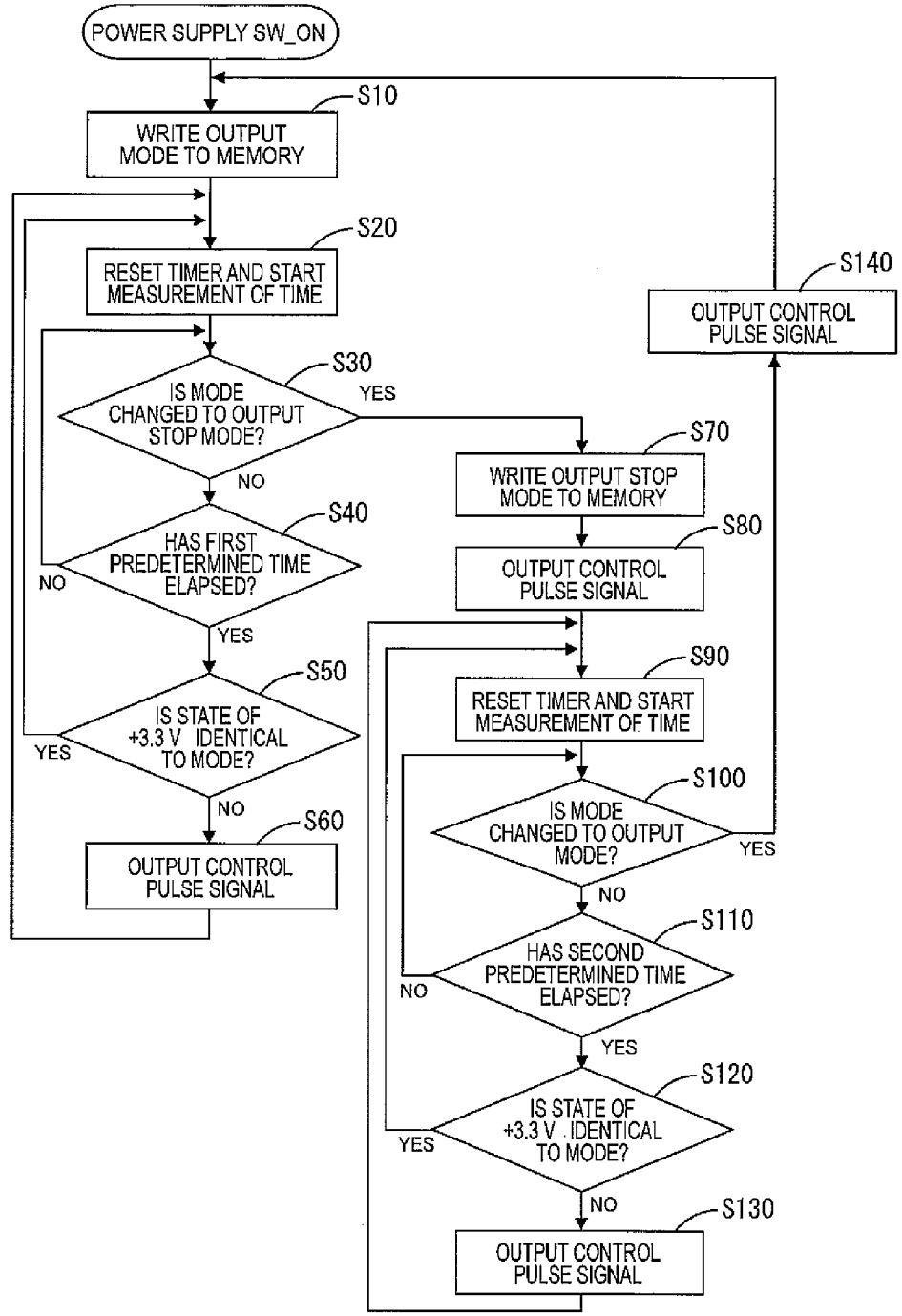
FIG. 8 is a flowchart illustrating the procedure of a mode recovery process.
Figure 9:
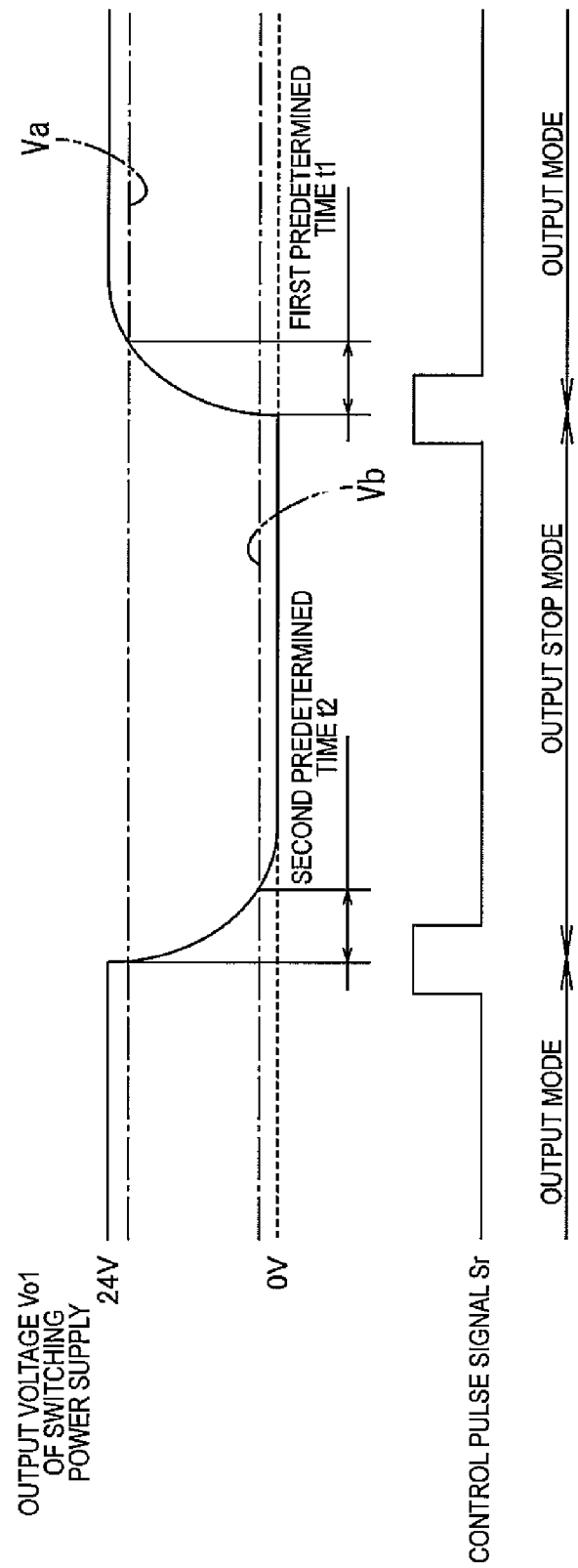
FIG. 9 is a diagram illustrating the output waveform of a switching power supply.

Next, a second embodiment of the invention will be described with reference to FIGS. 7 to 9.

A power supply system S according to the second embodiment is different from that according to the first embodiment in that it further includes a mode recovery function. The mode recovery function means a function that returns the mode to the original set mode when the control IC 50 falsely recognizes the input of a surge to the control input port EN as the input of the control pulse signal Sr and changes the mode.

Figure 7:
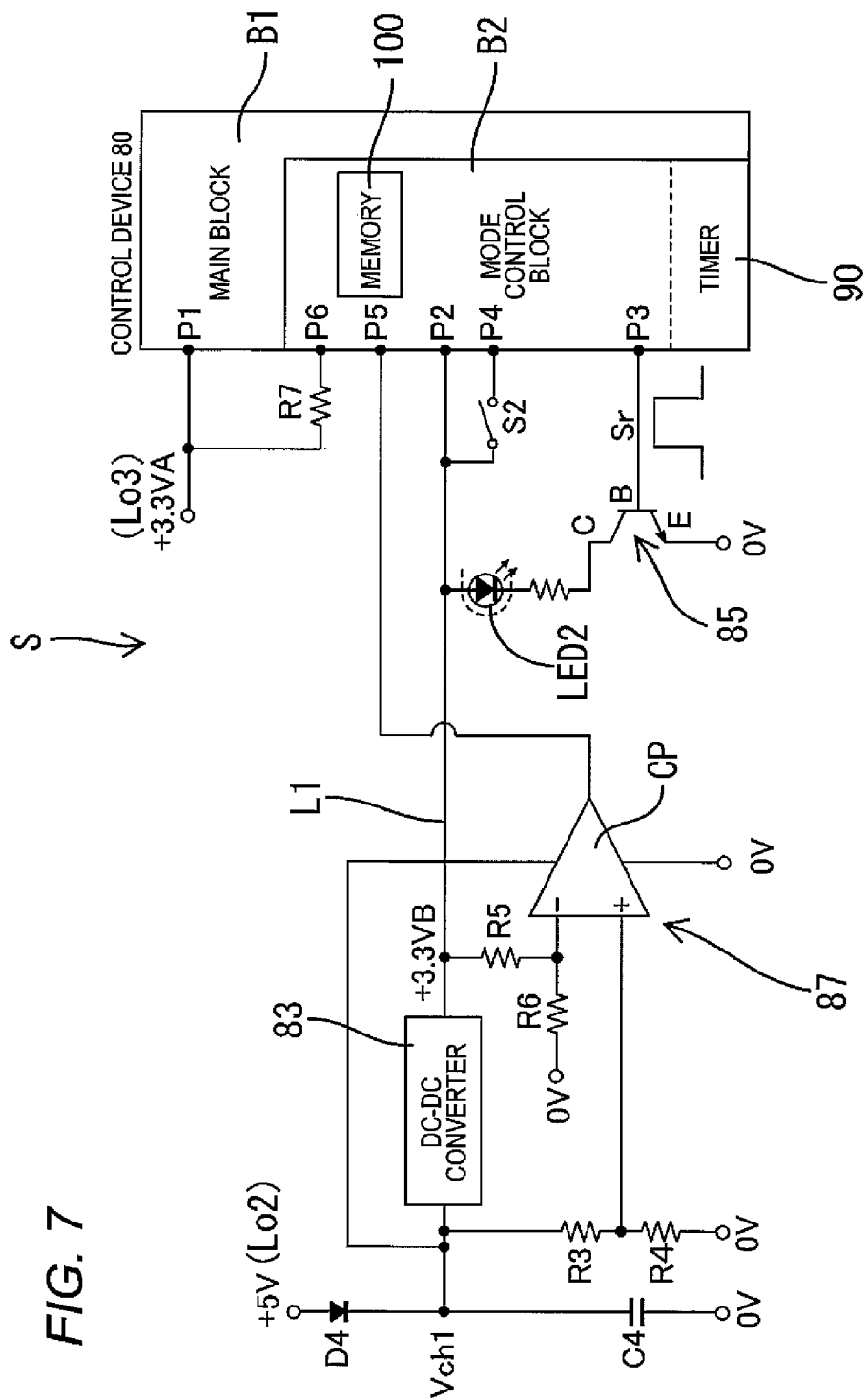
FIG. 7 is a circuit diagram illustrating a control device according to a second embodiment of the invention.

In the second embodiment, in order to add the mode recovery function, a memory (an example of a "storage unit") 100 that stores the content of the mode settings is provided in the mode control block B2 of the control device 80 and a check port P6 is provided in the mode control block B2 (FIG. 7). The check port P6 is connected to the output line Lo3 for the output of 3.3 V through a resistor R7 and it is possible to detect whether a voltage is applied to the output line Lo3. The check port P6 and the resistor R7 correspond to a "detecting unit" according to the invention.

Next, the flow of a mode recovery process performed by the mode control block B2 of the control device 80 will be described with reference to FIG. 8. When the power supply switch S1 is turned on, the mode recovery process starts. First, in Step S10, the mode control block B2 performs a process of writing the content of the mode settings to the memory 100. In this embodiment, the "output mode" is written as the content of the mode settings. This is because the switching power supply 20 is certainly changed to the output mode when power is turned on.

When the content of the mode settings is written to the memory 100, the process proceeds to Step S20 and the timer 90 is reset. Then, the timer 90 starts to measure time.

In Step S30, it is determined whether there is an instruction to change the mode to the output stop mode. The mode is changed to the output stop mode, for example, when the mode switch S2 is operated in the output mode or when the printer 1 is maintained in the standby state for a predetermined period of time. Therefore, when the mode switch S2 is not operated and the standby state is maintained within the predetermined period of time, the determination result is "NO" and the process proceeds to Step S40.

Then, in Step S40, it is determined whether a first predetermined time t1 has elapsed. Specifically, when the time measured by the timer 90 is more than the first predetermined time t1, the determination result is "YES". On the other hand, when the measured time is less than the first predetermined time, the determination result is "NO". The reason why it is determined whether the first predetermined time t1 has elapsed is that the first predetermined time t1 is required to increase the output of the switching power supply 20 to a predetermined level Va, as shown in FIG. 9.

When the time measured by the timer 90 is more than the first predetermined time t1, the determination result in Step S40 is "YES" and the process proceeds to Step S50. In Step S50, the mode control block B2 determines whether the content of the mode settings stored in the memory 100 is identical to the state of the switching power supply 20. Specifically, first, in order to detect the state of the switching power supply 20, the mode control block B2 accesses the check port P6 and reads the voltage level of the check port P6.

In this case, when the level of the check port P6 is "3.3 V (high level)", the switching power supply 20 is in the "output mode". Therefore, the mode control block B2 determines that the content of the mode settings is identical to the state of the switching power supply 20 on the basis of the level of the check port P6 being "3.3 V (high level)" (determination result: YES).

When the determination result in Step S50 is "YES", the process returns to Step S20 and Steps S20 to S40 are repeated. When the time measured by the timer 90 is more than the first predetermined time t1, the process proceeds to Step S50 again and it is determined whether the content of the mode settings stored in the memory 100 is identical to the state of the switching power supply 20.

When the determination process in Step S50 is performed and the level of the check port P6 is "0 V (low level)", the switching power supply 20 is in the "output stop mode". Therefore, in this case, the mode control block B2 determines that the content of the mode settings is not identical to the state of the switching power supply 20 (determination result: NO).

When the determination result in Step S50 is "NO", the process proceeds to Step S60 and the mode control block B2 outputs the control pulse signal Sr (corresponding to "re-output" according to the invention). When the control pulse signal Sr is output, the control IC 50 changes the mode of the switching power supply 20. Then, the mode of the switching power supply 20 is changed from the "output stop mode" to the "output mode". In this way, the switching power supply 20 returns to the mode settings written to the memory. Then, the process returns to Step S20 and Steps S20 to S40 are repeatedly performed.

Next, a case in which the determination result in Step S30 is "YES" (the mode switch S2 is operated) will be described. When the determination result in Step S30 is "YES", the process proceeds to Step S70.

In Step S70, the mode control block B2 writes the content of the mode settings to the memory 100. In this embodiment, the "output stop mode" is written as the content of the mode settings.

When mode settings are written to the memory 100, the process proceeds to Step S80 and the mode control block B2 outputs the control pulse signal Sr. Then, the control IC 50 changes the mode of the switching power supply 20 from the "output mode" to the "output stop mode".

Then, in Step S90, the timer 90 is reset and the measurement of time by the timer 90 starts. Then, the process proceeds to Step S100. In Step S100, the mode control block B2 determines whether there is an instruction to change to the output mode. The mode is changed to the output mode when the elapsed time measured by the timer 90 is equal to the set time, when the comparator CP outputs a low-level detection signal, and when the mode switch S2 is operated. When these conditions are satisfied, the determination result is "NO" and the process proceeds to Step S110.

In Step S120, it is determined whether a second predetermined time t2 has elapsed. Specifically, when the time measured by the timer 90 is more than the second predetermined time t2, the determination result is "YES". When the measured time is less than the second predetermined time, the determination result is "NO". The reason why it is determined whether the second predetermined time t2 has elapsed is that the second predetermined time t2 is required to increase the output of the switching power supply 20 to a predetermined level Vb, as shown in FIG. 9.

When the time measured by the timer 90 is more than the second predetermined time t2, the determination result in Step S110 is "YES" and the process proceeds to Step S120. In Step S120, the mode control block B2 determines whether the content of the mode settings stored in the memory 100 is identical to the state of the switching power supply 20. Specifically, first, in order to detect the state of the switching power supply 20, the mode control block B2 accesses the check port P6 and reads the voltage level of the check port P6.

In this case, when the voltage level of the check port P6 is "0 V (low level)", the switching power supply 20 is in the "output stop mode". Therefore, the mode control block B2 determines that the content of the mode settings is identical to the state of the switching power supply 20 on the basis of the voltage level of the check port P6 being "0 V (low level)" (determination result: YES).

When the determination result in Step 120 is "YES", the process returns to Step S90 and Steps S90 to S110 are repeatedly performed. When the time measured by the timer 90 is more than the second predetermined time t2, the process proceeds to Step S120 again and it is determined whether the content of the mode settings stored in the memory 100 is identical to the state of the switching power supply 20.

When the determination process in Step S120 is performed and the voltage level of the check port P6 is "3.3 V (high)", the switching power supply 20 is in the "output mode". Therefore, in this case, the mode control block B2 determines that the content of the mode settings is not identical to the state of the switching power supply 20 (determination result: NO).

When the determination result in Step S120 is "NO", the process proceeds to Step S130 and the mode control block B2 outputs the control pulse signal Sr. When the control pulse signal Sr is output (corresponding to "re-output" according to the invention), the control IC 50 changes the mode of the switching power supply 20. Then, the mode of the switching power supply 20 is changed from the "output mode" to the "output stop mode". In this way, the switching power supply 20 returns to the mode settings written to the memory 100.

As described above, the power supply system S according to the second embodiment has the mode recovery function. Therefore, for example, when the control IC 50 falsely recognizes the input of a surge to the control input port EN as the input of the control pulse signal Sr and changes the mode, it is possible to return the operation mode to the original mode.

The processing function of a "check unit" according to the invention is implemented by the determination process in Steps S50 and S120 performed by the mode control block B2 of the control device 80. In addition, the following is implemented by the process in Steps S60 and S130 performed by the mode control block B2: "when the content of the mode settings is not identical to the detection result, the control pulse signal is re-output to the switching power supply such that the switching power supply is changed to the set mode".

<Third Embodiment>

Next, a third embodiment of the invention will be described with reference to FIG. 5. In the second embodiment, the voltage of the output line Lo3 is detected in order to detect the state of the switching power supply 20 (whether the mode is the output mode or the output stop mode). Specifically, the resistor R7 is used to detect the voltage of the output line Lo3.

In the third embodiment, communication with the main block B1 is performed to detect the state of the switching power supply 20 (whether the mode is the output mode or the output stop mode). That is, when the switching power supply 20 is in the output mode, the main block B1 is supplied with power from the DC-DC converter 45 and is operated. Therefore, the switching power supply 20 can communicate with the mode control block B2 through a bus line.

On the other hand, when the switching power supply 20 is in the output stop mode, the supply of power to the main block B1 is cut and the main block B1 is stopped. As a result, communication is unavailable. Therefore, the mode control block B2 can detect the state of communication with the main block B1 to detect the state of the switching power supply 20 (whether the mode is the output mode or the output stop mode). In this case, it is possible to remove the resistor R7 for detecting the voltage of the output line Lo3 or the check port P6.

<Fourth Embodiment>

Next, a fourth embodiment of the invention will be described with reference to FIGS. 10 and 11. In the first embodiment, when the mode of the switching power supply 20 is changed from the output mode to the output stop mode and from the output stop mode to the output mode, the mode control block B2 transmits the control pulse signal Sr with the same pulse width to the control IC 50.

Figure 10:
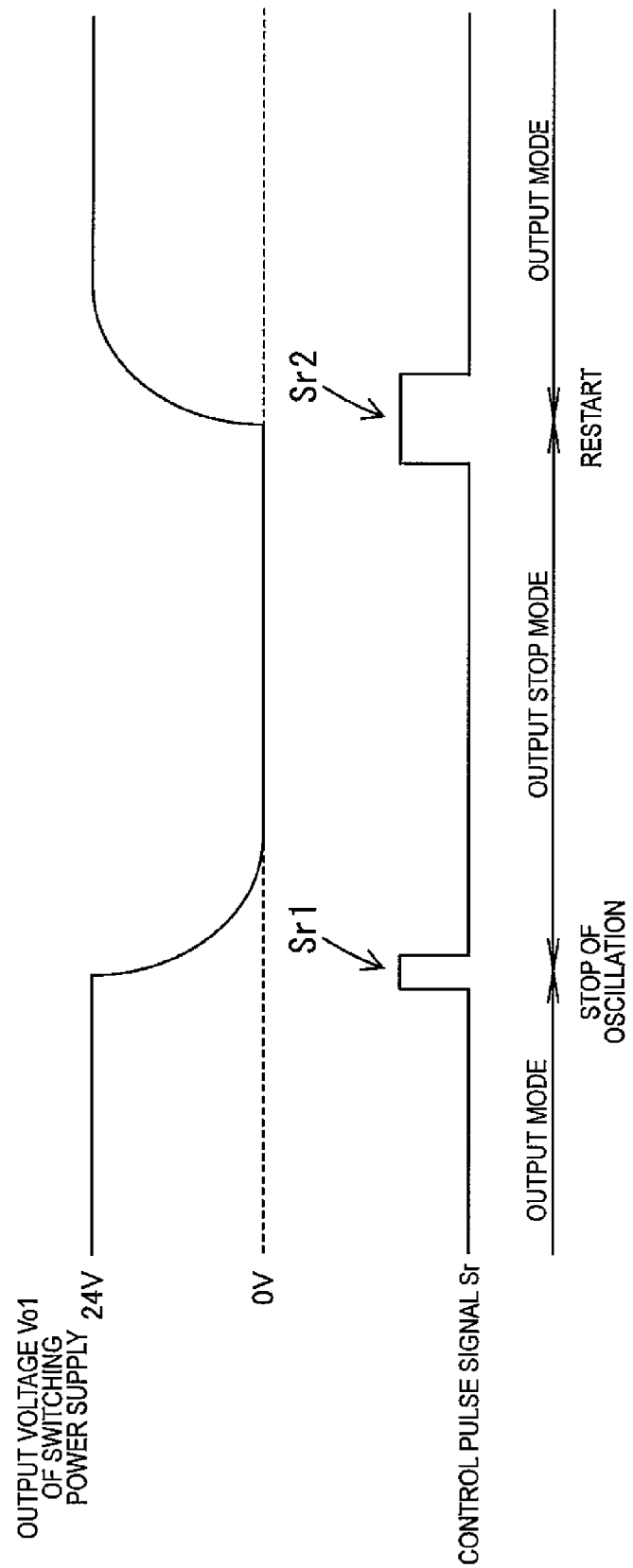
FIG. 10 is a diagram illustrating the waveform of a control pulse signal according to a fourth embodiment of the invention.
Figure 11:
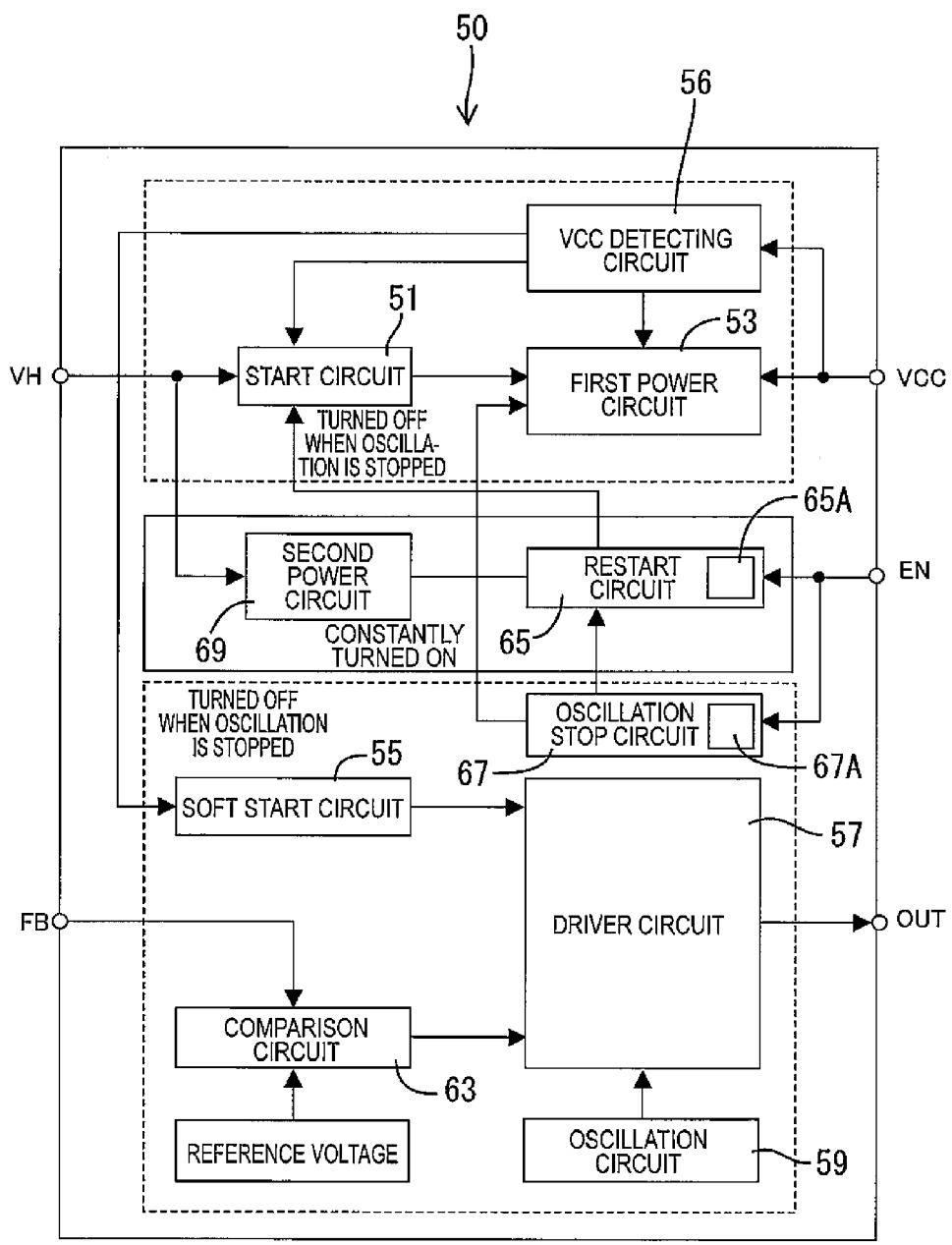
FIG. 11 is a block diagram illustrating a control IC.

In the fourth embodiment, when the mode of the switching power supply 20 is changed from the output mode to the output stop mode and from the output stop mode to the output mode, the pulse width of the control pulse signal Sr varies (see FIG. 10).

In addition, pulse width detecting units 65A and 67A that detect the pulse width are respectively provided in the restart circuit 65 and the oscillation stop circuit 67 and it is checked whether an oscillation stop signal is a restart signal on the basis of the value of the pulse width. For example, as shown in FIG. 10, a control pulse signal Sr1 with a small pulse width is recognized as the oscillation stop signal and a control pulse signal Sr2 with a large pulse width is recognized as the restart signal.

In this way, each of the circuits 65 and 67 can recognize whether the input control pulse signal Sr is a signal which is output for stopping oscillation or a signal which is output for restart and it is possible to prevent an error in operation due to the use of the common control input port EN. Specifically, it is possible to prevent an error in operation in which the restart circuit 65 falsely recognizes the control pulse signal Sr1 output for stopping oscillation as the restart signal and restarts the switching power supply 20 when the mode is changed from the output mode to the output stop mode.

In the fourth embodiment, it is checked whether the control pulse signal is the oscillation stop signal or the restart signal on the basis of the value of the pulse width of the control pulse signal Sr. Therefore, the inhibition circuit 75 provided in the first embodiment is removed and the restart circuit 65 is constantly supplied with power from the second power circuit 69 (see FIG. 11). The term "constantly supplied with power" means that power is supplied in both the output mode and the output stop mode.

<Fifth Embodiment>

Next, a fifth embodiment of the invention will be described with reference to FIGS. 10 and 12.

In the first embodiment, when the mode of the switching power supply 20 is changed from the output mode to the output stop mode and from the output stop mode to the output mode, the mode control block B2 transmits the control pulse signal Sr with the same pulse width to the control IC 50.

In the fifth embodiment, when the mode of the switching power supply 20 is changed from the output mode to the output stop mode and from the output stop mode to the output mode, the pulse width of the control pulse signal Sr varies. Specifically, as shown in FIG. 10, a control pulse signal Sr1 with a small pulse width is used as the oscillation stop signal and a control pulse signal Sr2 with a large pulse width is used as the restart signal.

Figure 12:
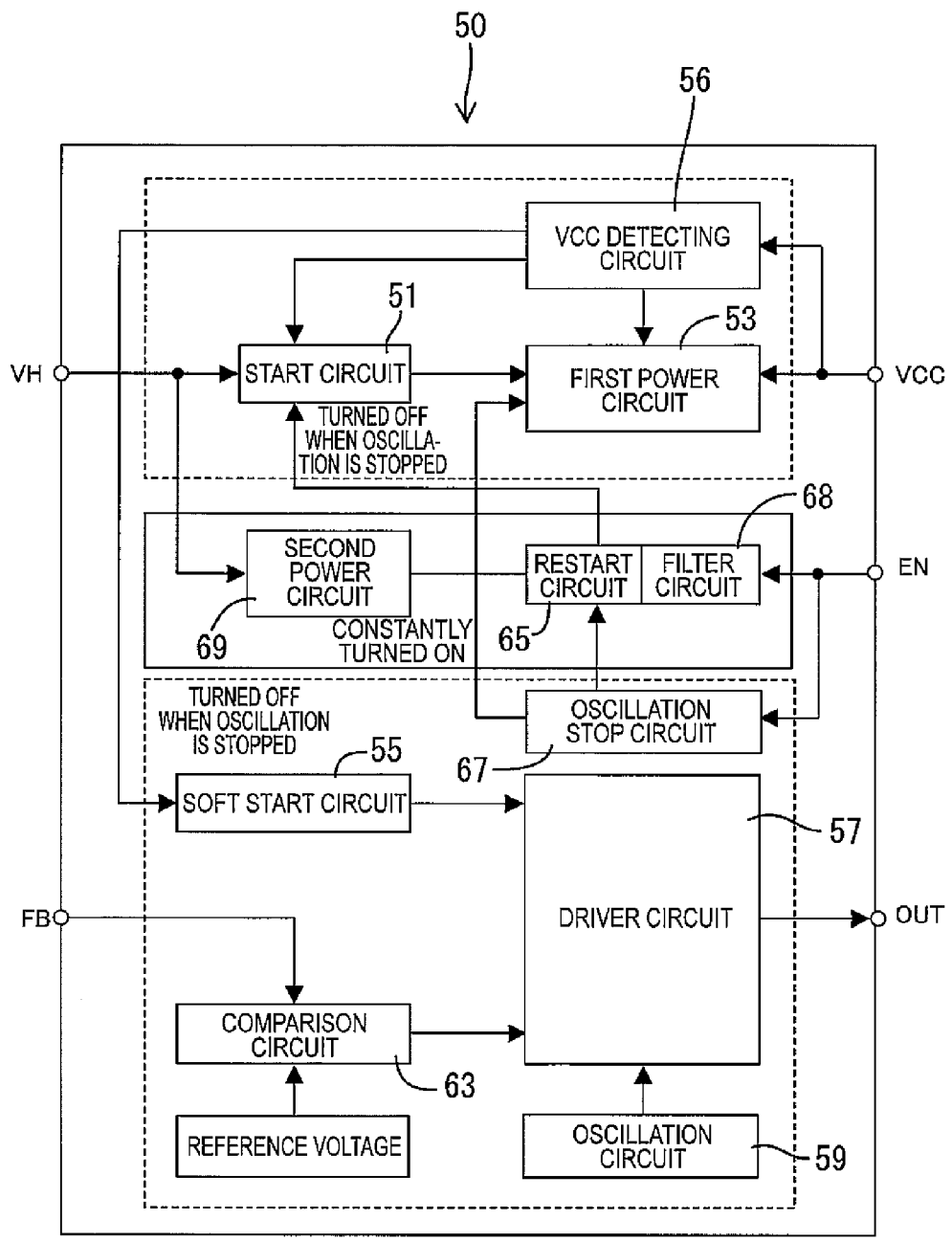
FIG. 12 is a block diagram illustrating a control IC according to a fifth embodiment of the invention.

As shown in FIG. 12, a filter circuit 68 is provided in the input stage of the restart circuit 65. The filter circuit 68 is, for example, an integration circuit including a resistor and a capacitor. The filter circuit 68 allows only the control pulse signal with a large pulse width to be input to the restart circuit 65 and removes (filters) the pulse control signal with a small pulse width.

According to this structure, only the control pulse signal Sr2 which is output for restart is input to the restart circuit 65. Therefore, it is possible to prevent an error in operation due to the use of the common control input port EN. Specifically, it is possible to prevent an error in operation in which the restart circuit 65 falsely recognizes the control pulse signal Sr1 output for stopping oscillation as the restart signal and restarts the switching power supply 20 when the mode is changed from the output mode to the output stop mode. In addition, in this structure, similarly to the fourth embodiment, it is possible to remove the inhibition circuit 75. That is, since the signal causing an error in operation is removed, the fifth embodiment can more reliably prevent an error in operation than the structure in which the pulse width is detected and it is determined whether the signal is suitable.

<Sixth Embodiment>

Figure 13:
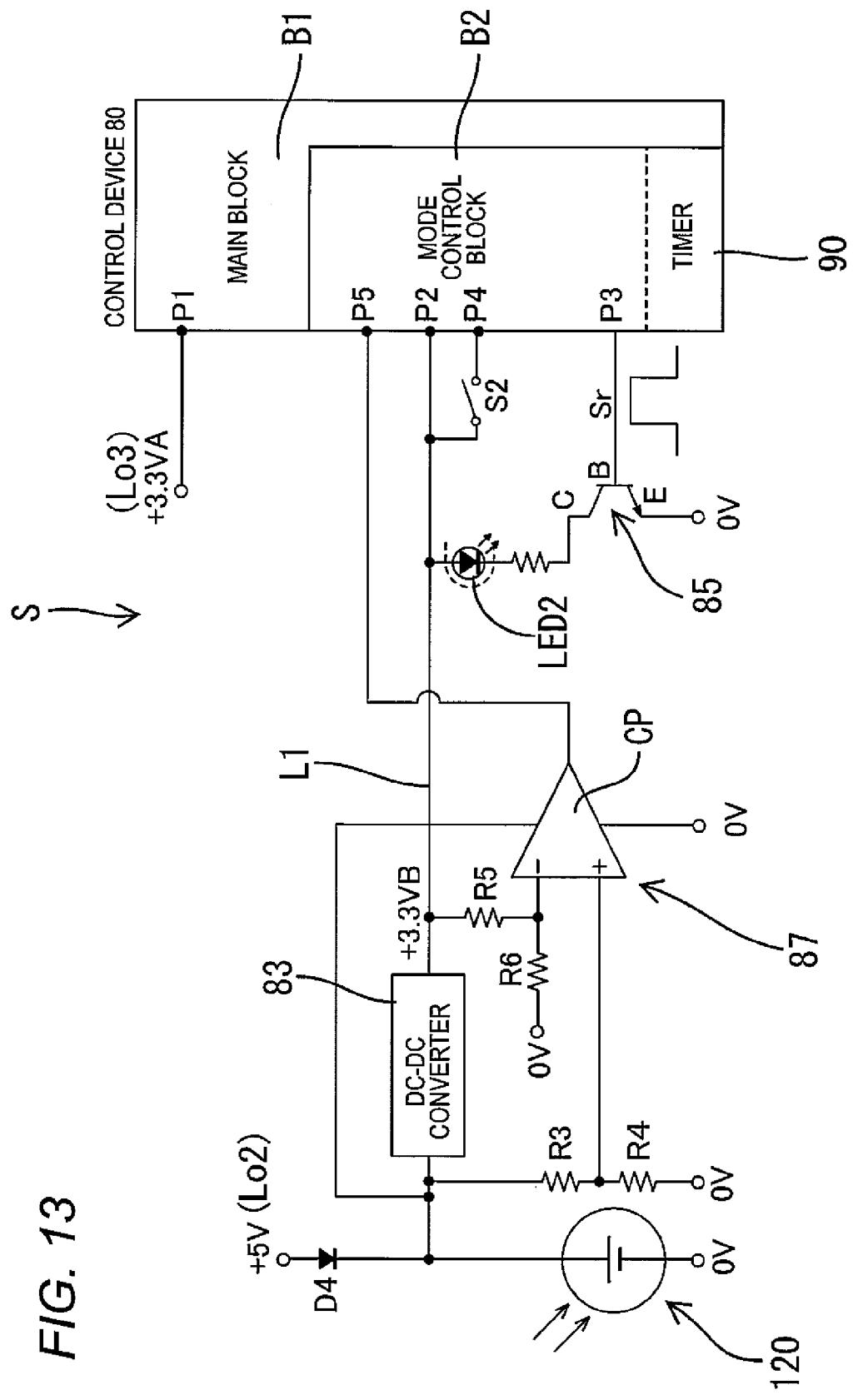
FIG. 13 is a circuit diagram illustrating a control device of a power supply system according to a sixth embodiment of the invention.

Next, a sixth embodiment of the invention will be described with reference to FIG. 13.

In the first embodiment, the capacitor (electric double layer capacitor) C4 is provided as a power supply when the mode control block B2 is in the output stop mode. When the capacitor C4 used as a power supply is discharged, the mode control block B2 of the control device 80 is shut down (stopped) unless the power supply switch 51 is turned on again.

The sixth embodiment has a structure in which a photoelectric cell (corresponding to a "photoelectric cell" according to the invention) 120 is used as the power supply when the mode control block B2 is in the output stop mode. In the structure in which the photoelectric cell 120 is used as a power supply, even when the generated electricity is completely consumed, the photoelectric cell 120 receives light, generates power again, and supplies power to the mode control block B2. Therefore, the mode control block B2 of the control device 80 is not shut down.

<Seventh Embodiment>

Next, a seventh embodiment of the invention will be described with reference to FIG. 14.

In the first embodiment, the second power circuit 69 is provided in order to supply power to the restart circuit 65. In the seventh embodiment, a capacitor (electric double layer capacitor) C5 is provided in order to supply power to the restart circuit 65. Specifically, the capacitor C5 is provided outside the control IC 50, receives a charging current from the first power circuit 53 through a forward diode D5, and is charged in the output mode. The capacitor C5 is an example of a "second electric storage unit" according to the invention.

Figure 14:
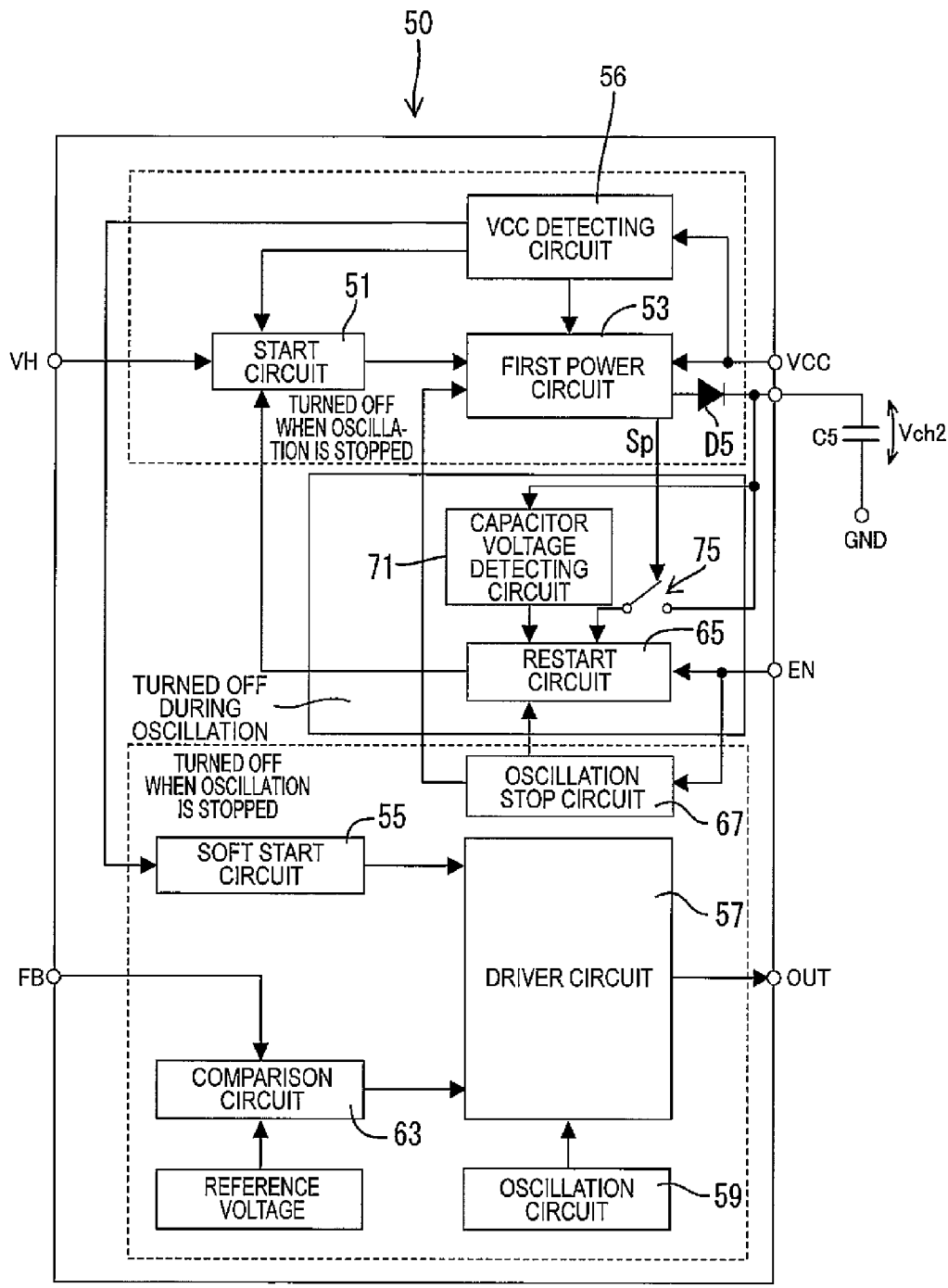
FIG. 14 is a block diagram illustrating a control IC according to a seventh embodiment of the invention.

When the restart circuit 65 is supplied with power from the first power circuit 53 in the output mode, the mode is changed from the output mode to the output stop mode, and the first power circuit 53 is broken, the restart circuit 65 is supplied with power from the capacitor C5, as shown in FIG. 14. In this structure, in the output stop mode, there is no power consumption through the input line Lin (no power consumption of the AC power supply) in the control IC 50; only the restart circuit 65 and the capacitor voltage detecting circuit 71 are supplied with power from the capacitor C5 and are operated. Therefore, it is possible to reduce power consumption.

In addition, the control IC 50 according to the seventh embodiment includes a capacitor voltage detecting circuit 71. The capacitor voltage detecting circuit 71 detects the charging voltage Vch2 of the capacitor C5. When the charging voltage Vch2 is reduced (less than a threshold value), the capacitor voltage detecting circuit 71 instructs the restart circuit 65 to restart the start circuit 51. Then, the switching power supply 20 is changed from the output stop mode to the output mode. As a result, it is possible to recharge the capacitor C5 whose voltage is reduced. In this structure, since the capacitor C5 is provided, the second power circuit 69 is removed.

<Eighth Embodiment>

Figure 15:
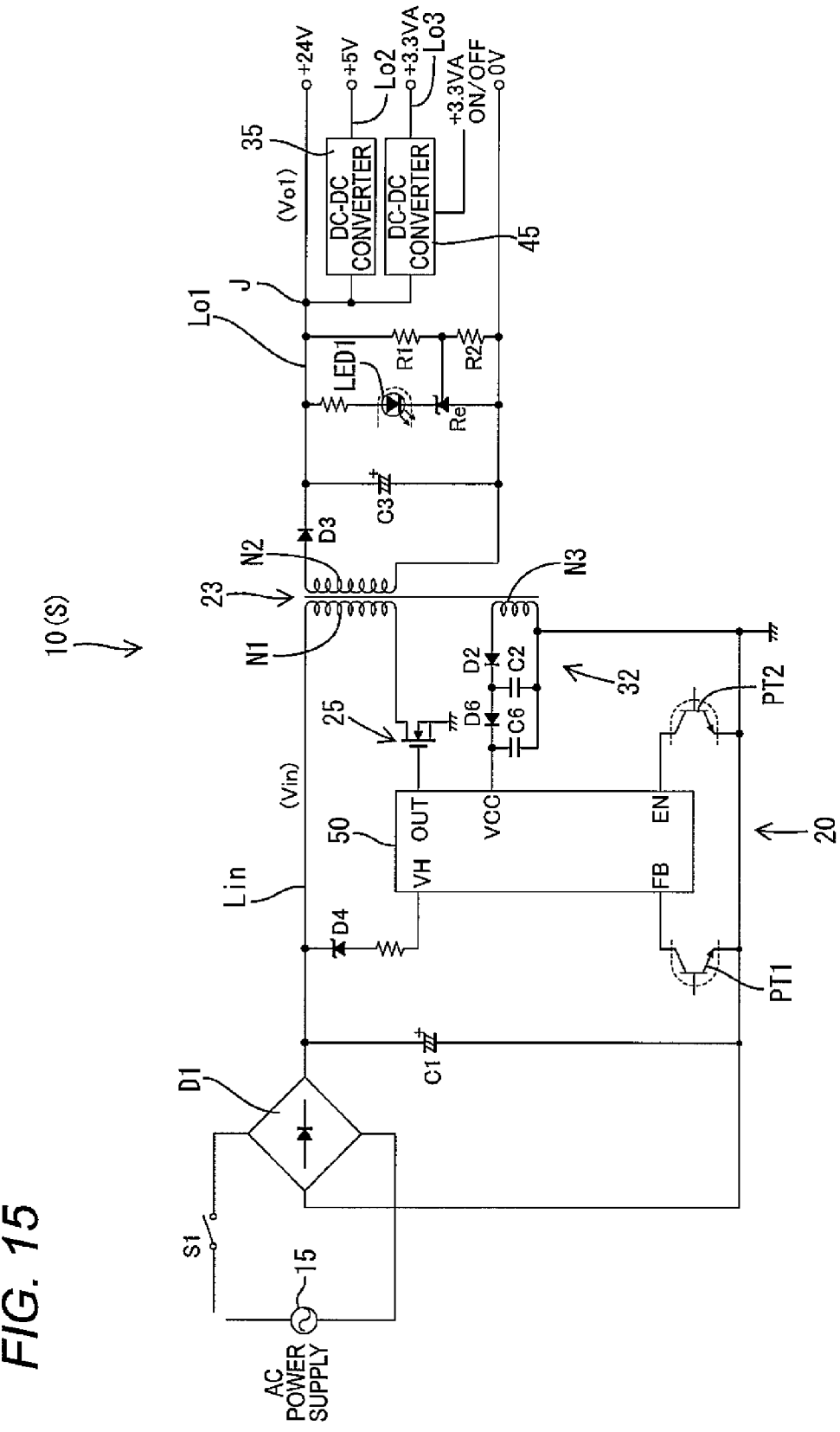
FIG. 15 is a circuit diagram illustrating a power supply device of a power supply system according to an eighth embodiment of the invention.
Figure 16:
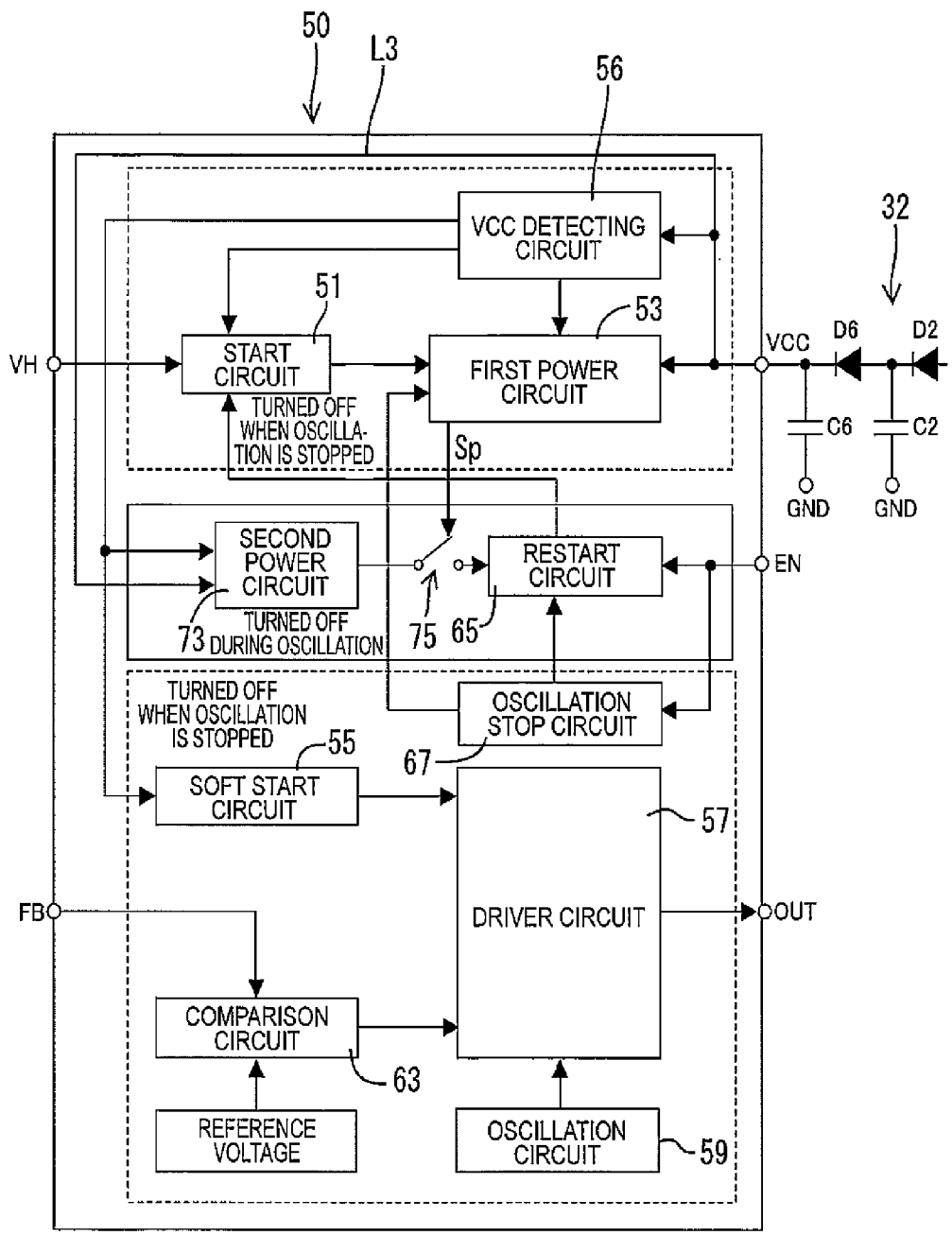
FIG. 16 is a block diagram illustrating a control IC.

Next, an eighth embodiment of the invention will be described with reference to FIGS. 15 and 16. In the first embodiment, the second power circuit 69 is provided for supplying power to the restart circuit 65. The second power circuit 69 is connected to the high-voltage input port VH and is supplied with power from the input line Lin.

In the eighth embodiment, the restart circuit 65 is supplied with power from the power supply port VCC, that is, a voltage generating circuit 32. Specifically, a second power circuit 73 serving as a power supply for the restart circuit 65 is connected to the power supply port VCC through a power supply line L3. The second power circuit 73 receives a voltage from the voltage generating circuit 32 and supplies power to the restart circuit 65 at a power supply voltage of 5 V. The voltage generating circuit 32 can supply power even in the output stop mode since capacitors C2 and C6 are charged in the output mode. That is, in the output stop mode, the second power circuit 73 reduces the voltage of the capacitors C2 and C6 to 5 V and outputs the voltage to the restart circuit 65.

In this structure, in the output stop mode, there is no power consumption through the input line Lin (no power consumption of the AC power supply) in the control IC 50 since only the restart circuit 65 and the VCC detecting circuit 56 are supplied with power from the second power circuit 73 and are operated. Therefore, it is possible to reduce power consumption.

The VCC detecting circuit 56 detects the voltage of the power supply port VCC (the voltage of the capacitors C2 and C6). When the voltage is reduced (less than a threshold value), the VCC detecting circuit 56 restarts the start circuit 51. Then, the switching power supply 20 is changed from the output stop mode to the output mode. As a result, the capacitors C2 and C6 are recharged.

In the voltage generating circuit 31 according to the first embodiment, the smoothing circuit is formed in one stage including the capacitor C2 and the diode D2. However, the voltage generating circuit 32 according to the eighth embodiment is formed in two stages of the capacitor C2 and the diode D2, and the capacitor C6 and the diode D6. This structure is for hastening the start of the control IC 50 (for reducing the amount of charging current flowing from the control IC 50 to the capacitor of the voltage generating circuit 32) and the capacitance of the capacitor C6 is set to be less than that of the capacitor C2. The capacitors C2 and C6 of the voltage generating circuit 32 are an example of the "second electric storage unit" according to the invention and the capacitors C2 and C6 are a voltage source (power supply source) of the second voltage circuit 73.

<Ninth Embodiment>

Next, a ninth embodiment of the invention will be described with reference to FIGS. 17 and 18. In the first embodiment, in the output mode, the inhibition circuit 75 opens the power line L2 and stops the restart circuit 65 to inhibit the output of the restart signal from the restart circuit 65 to the start circuit 51. The ninth embodiment is different from the first embodiment in that an inhibition circuit 150 includes a logic circuit.

Figures 17, 18:
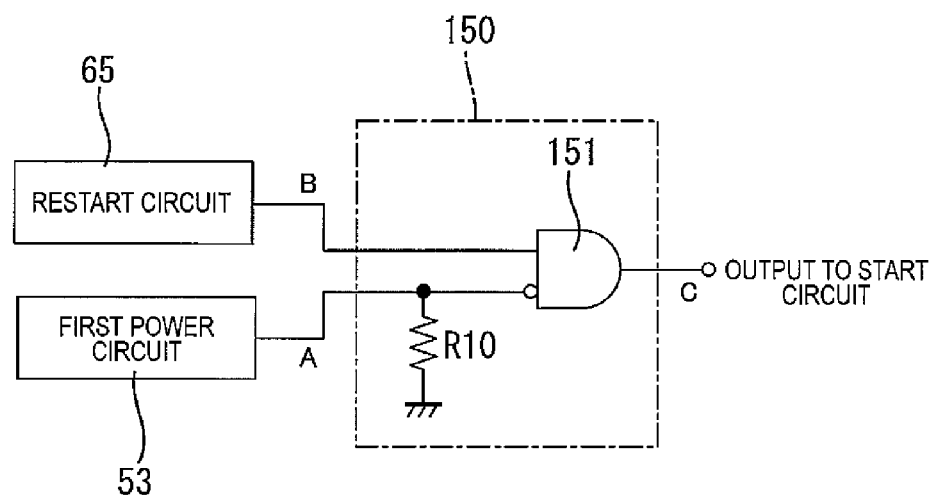
FIG. 17 is a circuit diagram illustrating an inhibition circuit according to a ninth embodiment of the invention.
FIG. 18 is a diagram illustrating a truth table.

Specifically, as shown in FIG. 17, the inhibition circuit 150 includes an AND circuit 151. The AND circuit 151 includes two inputs and one output. That is, the AND circuit 151 includes an A-side input terminal to which the output voltage of the first power circuit 53 is input, a B-side input terminal to which the output of the restart circuit 65 is input, and an output terminal C connected to the start circuit 51. The output of the AND circuit 151 is input to the start circuit 51. The A-side input of the AND circuit 151 is a negative logic input and is connected to the ground through a resistor R10.

As described above, since the A-side input of the AND circuit 151 is the negative logic input, the output of the AND circuit 151 is at a low level regardless of the output of the restart circuit 65 when the output voltage of the first power circuit 53 is at a high level (in other words, in the output mode in which the first power circuit 53 generates a voltage of 5 V). Therefore, in the output mode, the output of the restart signal from the restart circuit 65 to the start circuit 51 is inhibited.

On the other hand, when the output voltage of the first power circuit 53 is at a low level (in other words, in the output stop mode in which the first power circuit 53 does not generate a voltage of 5 V), the output of the AND circuit 151 corresponds to the output of the restart circuit 65. That is, when the output of the restart circuit 65 is at a high level, the AND circuit 151 outputs a high-level signal. When the output of the restart circuit 65 is at a low level, the AND circuit 151 outputs a low-level signal. Therefore, in the output mode, it is possible to transmit the output of the restart circuit 65, that is, the restart signal to the start circuit 51.

In the above description, a logic operation is performed between the output of the first power circuit 53 and the output of the restart circuit 65. However, the logic operation may be performed between the output of the first power circuit 53 and the input of the restart circuit 65. In this case, it is possible to perform the same circuit operation as that of the inhibition circuit 150 shown in FIG. 17. That is, the following operation may be performed: the output of a signal from the restart circuit 65 to the start circuit 51 is inhibited in the output mode and the input of a signal from the restart circuit 65 to the start circuit 51 is allowed in the output stop mode.

<Other Embodiments>

The invention is not limited to the above description and the embodiments described with reference to the drawings. For example, the following embodiments are also included in the technical scope of the invention.

(1) In the first to ninth embodiments, the power supply system 5 is used in the printer. However, the power supply system 5 may be applied to any electric apparatus and the purpose of use of the power supply system 5 is not limited to the printer. For example, the power supply system 5 may be widely applied to home appliances, such as televisions or video players. In addition, in the first to eighth embodiments, the electrophotographic printer is given as an example, but the invention may be applied to an inkjet printer.

(2) In the first to ninth embodiments, the FET (field effect transistor) is given as an example of the semiconductor switching element, but a bipolar transistor may be used.

Figure 19:
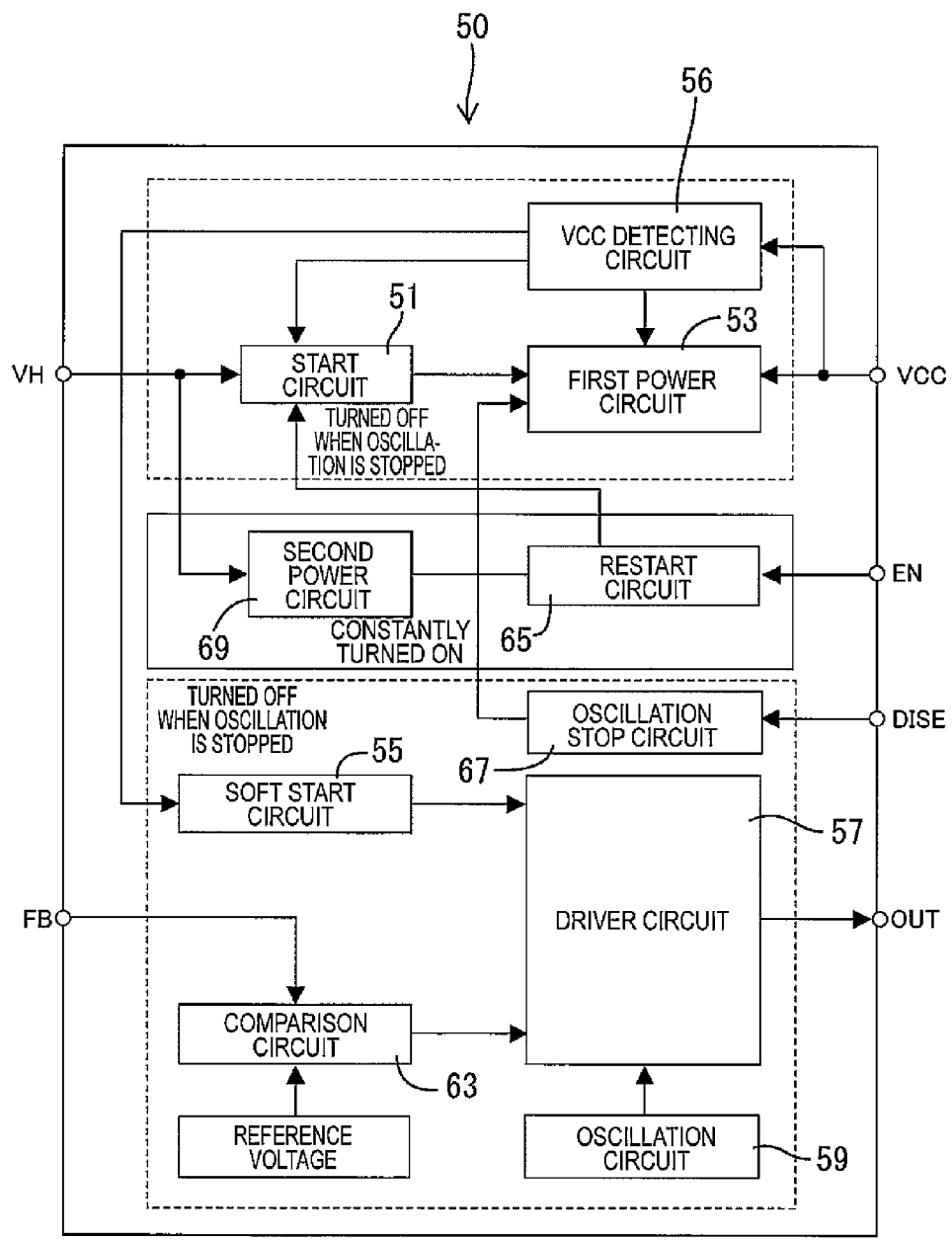
FIG. 19 is a diagram illustrating a modification (a block diagram illustrating a control IC)

(3) In the first to ninth embodiments, the restart circuit 65 and the oscillation stop circuit 67 use the common control input port EN. However, signal input ports may be independently provided for the two circuits, as shown in FIG. 19. That is, the control input port EN may be provided so as to correspond to the restart circuit 65 and a control input port DISE may be provided so as to correspond to the oscillation stop circuit 67.

Figure 20:
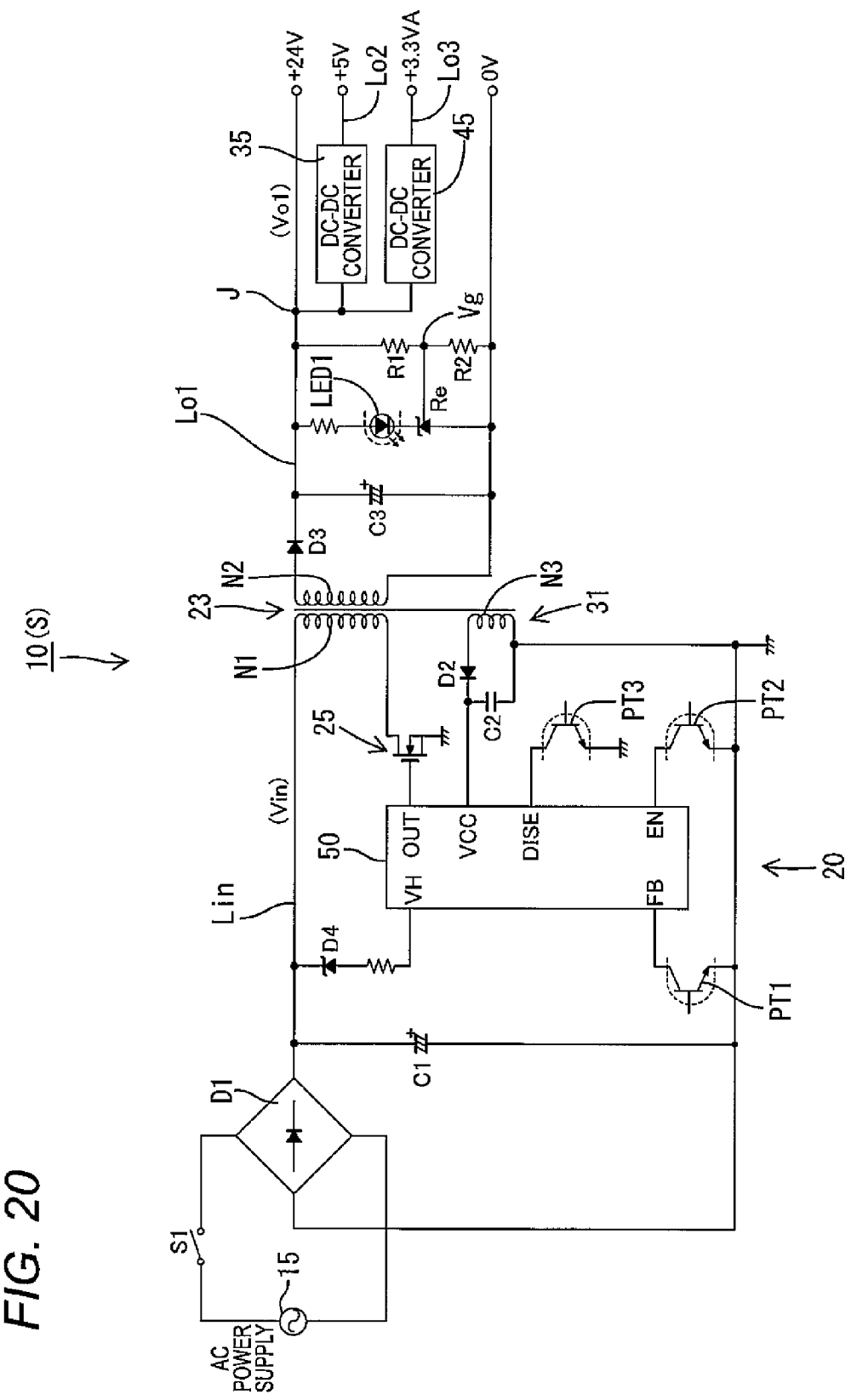
FIG. 20 is a diagram illustrating a modification (a circuit diagram illustrating a power supply device of a power supply system)
Figure 21:
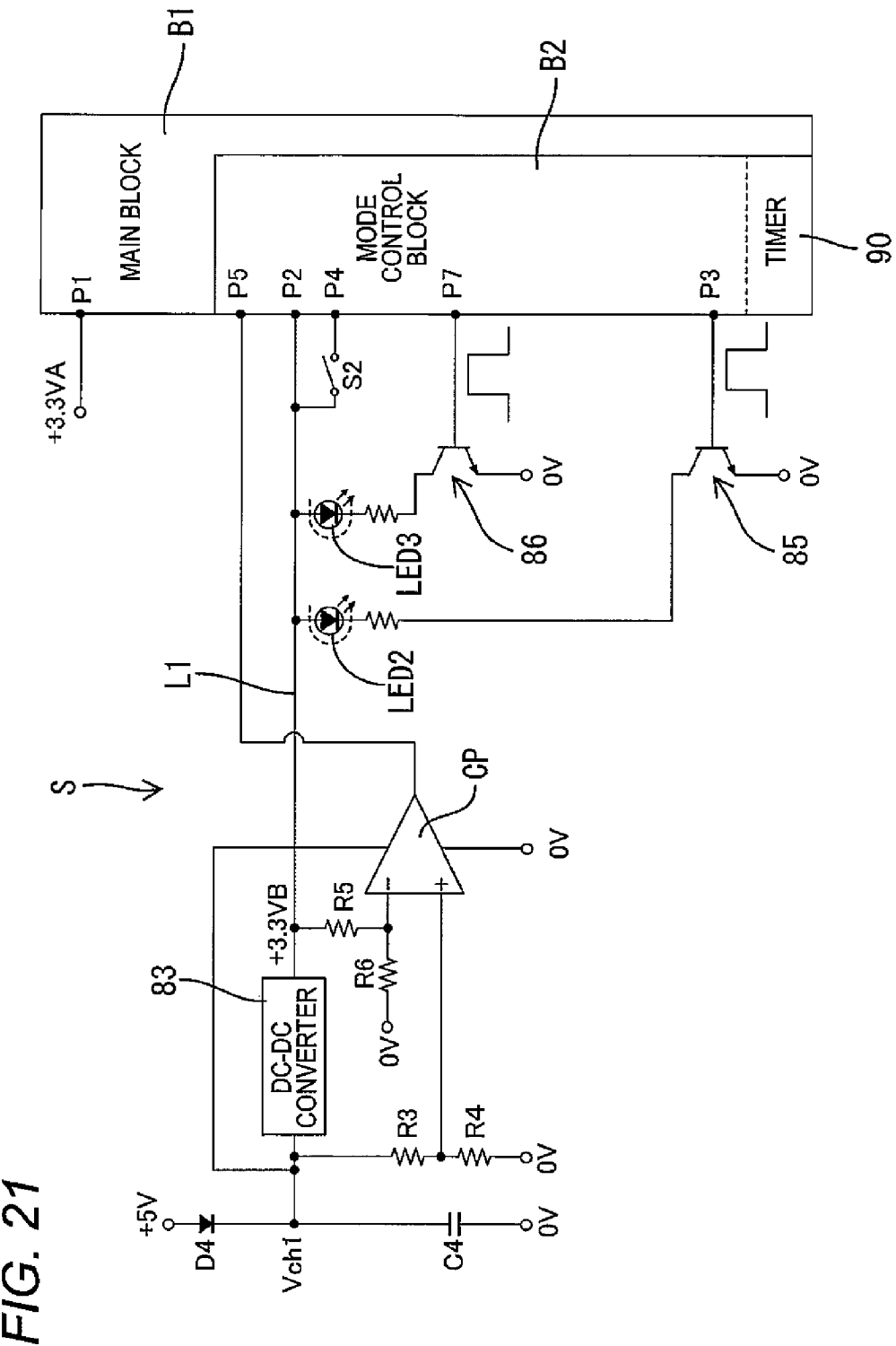
FIG. 21 is a diagram illustrating a modification (a circuit diagram illustrating a control device of a power supply system)

When the ports are separately provided, it is necessary to separately provide photocouplers and driving transistors for oscillation stop and restart, as shown in FIGS. 20 and 21. In brief, a set of the phototransistors PT2 connected to the control input port EN of the control IC 50 and the light emitting diode LED2 forms a photocoupler, and a set of a phototransistors PT3 connected to the control input port DISE of the control IC 50 and a light emitting diode LED3 forms a photocoupler. A transistor 85 may be provided for driving the light emitting diode LED2 and a transistor 86 may be provided for driving the light emitting diode LED3.

According to this structure, the control pulse signal output from the port P3 is input to the control input port EN of the control IC 50 and the control pulse signal output from the port P7 is input to the control input port DISE of the control IC 50.

(4) In the first to ninth embodiments, the control device 80 is configured so as to include two functional blocks, that is, the main block B1 and the mode control block B2. However, the control device 80 may include at least the mode control block B2. For example, the main block B1 may be provided separately from the control device 80.

Figure 22:
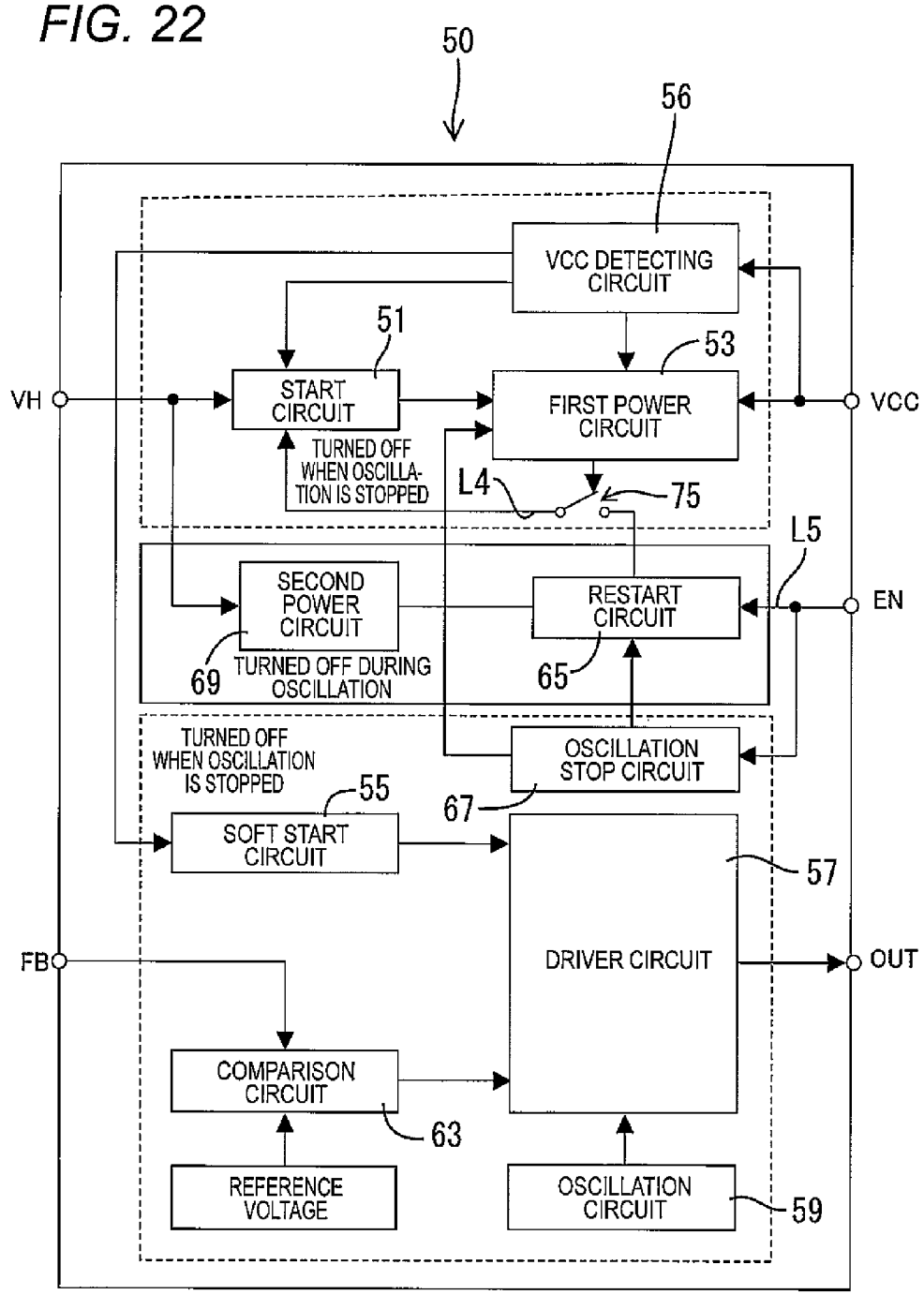
FIG. 22 is a diagram illustrating a modification (a block diagram illustrating a control IC).

(5) In the first embodiment, the inhibition circuit 75 is provided on the power line L2. The inhibition circuit 75 may be provided at any position as long as it inhibits the output of a signal from the restart circuit 65 to the start circuit 51 in the output mode. For example, as shown in FIG. 22, the inhibition circuit 75 may be provided on the output side of the restart circuit 65 so as to open the output line L4 of the restart circuit 65 in the output mode. In addition, the inhibition circuit 75 may be provided on the input side of the restart circuit 65 so as to open the input line L5 of the restart circuit 65 in the output mode.

(6) Each of the inhibition circuit 75 according to the first embodiment and the inhibition circuit 150 according to the ninth embodiment inhibits the output of the signal from the restart circuit 65 to the start circuit 51 in the output mode. The inhibition circuits 75 and 150 may avoid the competition between the restarting operation by the restart circuit 65 and the oscillation stopping operation by the oscillation stop circuit 67. The inhibition circuits 75 and 150 may inhibit the restart circuit 65 from restarting the start circuit 51 at least when the oscillation stop circuit 67 stops the oscillation of the transformer 23.

In order to achieve the circuit operation, the output of the oscillation stop circuit 67 may be input to the first power circuit 53 and the base B of the transistor 78 in the inhibition circuit 75 and the power line L2 may be opened to stop the restart circuit 65 during the output operation of the oscillation stop circuit 67 outputting a signal. In this way, the output of a signal from the restart circuit 65 to the start circuit 51 is inhibited during the output operation of the oscillation stop circuit 67.

The output of the oscillation stop circuit 67 may be input to the first power circuit 53 and the A-side input terminal of the AND circuit 151. In this case, during the output operation of the oscillation stop circuit 67, the output of the AND circuit 151 is at a low level regardless of the output of the restart circuit 65. Therefore, the output of a signal from the restart circuit 65 to the start circuit 51 is inhibited during the output operation of the oscillation stop circuit 67.

(7) In the fourth and fifth embodiments, the pulse width of the control pulse signal Sr is determined as follows. The pulse width for changing the mode from the output mode to the output stop mode decreases and the pulse width for changing the mode from the output stop mode to the output mode increases. The pulse widths may be classified into a pulse width for a change to the output mode stop and a pulse width for a change to the output mode. Contrary to the fourth and fifth embodiments, the pulse width for a change to the output stop mode may increase and the pulse width for a change to the output mode may increase. When the pulse widths are set in this way, it is necessary to remove the control pulse signal with a large pulse width using the filter circuit 68.

What is claimed is:

1. A power supply system comprising:
    a power supply device including a switching power supply that converts an input voltage applied from a main power supply and outputs a converted voltage; and
    a control device that is a different device from the power supply device and is supplied with power from the switching power supply of the power supply device,
    wherein the switching power supply of the power supply device includes:
        a transformer;
        a semiconductor switching element that is connected to a primary coil of the transformer;
        a switch control unit that controls the switching of the semiconductor switching element; and
        a rectifying/smoothing circuit that is provided on a secondary side of the transformer,
    the switch control unit starts up in response to being supplied with power from the main power supply and starts to control the switching of the semiconductor switching element, thereby oscillating a primary side of the transformer to induce a voltage on the secondary side of the transformer,
    the control device outputs a control pulse signal to the switch control unit to stop the oscillation of the transformer, thereby changing the mode of the switching power supply to an output stop mode, in an output mode in which the switching power supply smoothes the voltage induced on the secondary side and outputs the smoothed voltage, and
    the power supply system further includes another power supply that is different from the switching power supply and the power supply device, the another power supply serving as a power supply for the control device in the output stop mode.

2. The power supply system according to claim 1,
    wherein, in the output stop mode, the control device outputs the control pulse signal to the switch control unit to restart the oscillation of the transformer, thereby changing the switching power supply from the output stop mode to the output mode.

3. The power supply system according to claim 2,
    wherein the switch control unit includes:
        a driver circuit that outputs an on/off signal to the semiconductor switching element to oscillate the transformer;
        a start circuit that is supplied with power from the main power supply and starts;
        a first power circuit that starts with the start of the start circuit and supplies power to the driver circuit in the output mode;
        an oscillation stop circuit that breaks the first power circuit to stop the oscillation of the transformer when the control pulse signal is input in the output mode;
        a restart circuit that restarts the start circuit when the control pulse signal is input in the output stop mode; and
        a second power circuit that supplies power to the restart circuit in the output stop mode.

4. The power supply system according to claim 3,
    wherein the switch control unit includes an input port to which the control pulse signal output from the control device is input, and
    the oscillation stop circuit and the restart circuit are commonly connected to the input port.

5. The power supply system according to claim 4,
wherein the switch control unit further includes an inhibition circuit that inhibits the restart circuit from restarting the start circuit when the oscillation stop circuit stops the oscillation of the transformer.

6. The power supply system according to claim 4,
wherein the control device outputs the control pulse signals with different pulse widths, a pulse width of the control pulse signal for a change to the output stop mode is different from a pulse width of the control pulse signal for a change to the output mode.

7. The power supply system according to claim 6,
wherein a filter circuit that removes the control pulse signal for the change to the output stop mode is provided in an input stage of the restart circuit.

8. The power supply system according to claim 4,
wherein the control device further includes:
   a storage unit that stores information indicating whether the mode settings of the switching power supply are the output mode or the output stop mode;
   a detecting unit that detects whether a state of the switching power supply is the output mode or the output stop mode; and
   a check unit that checks a content of the mode settings stored in the storage unit and a detection result of the detecting unit, and
when the content of the mode settings is not identical to the detection result, the control pulse signal is re-output to the switching power supply such that the switching power supply is changed to the set mode.

9. The power supply system according to claim 8,
wherein the detecting unit detects an output voltage from the switching power supply.

10. The power supply system according to claim 3,
wherein the switch control unit further includes a second electric storage unit that is charged by a voltage which is induced in an auxiliary coil provided on the primary side of the transformer or the first power circuit, which serves as a power supply, in the output mode and functions as a voltage source of the second power circuit or the second power circuit.

11. An image forming apparatus comprising:
a printing unit that performs a printing process; and
the power supply system according to claim 1,
wherein the switching power supply of the power supply system supplies power to the printing unit in the output mode, and
the supply of power from the switching power supply of the power supply system to the printing unit is stopped in the output stop mode.

12. The power supply system according to claim 1,
wherein the switch control unit includes a control IC, and
wherein the control pulse signal, which is output from the control device, is input to an input port of the control IC.

* * * * *